United States Patent
Showa et al.

(10) Patent No.: US 12,555,613 B2
(45) Date of Patent: Feb. 17, 2026

(54) BASE AND HARD DISK DRIVE DEVICE

(71) Applicant: MINEBEA MITSUMI Inc., Nagano (JP)

(72) Inventors: Hideaki Showa, Kitasaku-gun (JP); Junichi Nakane, Kitasaku-gun (JP)

(73) Assignee: MINEBEA MITSUMI Inc., Nagano (JP)

(*) Notice: Subject to any disclaimer, the term of this patent is extended or adjusted under 35 U.S.C. 154(b) by 0 days.

(21) Appl. No.: 18/432,252

(22) Filed: Feb. 5, 2024

(65) Prior Publication Data
US 2024/0274158 A1    Aug. 15, 2024

(30) Foreign Application Priority Data
Feb. 9, 2023  (JP) ................... 2023-018204

(51) Int. Cl.
*G11B 33/02* (2006.01)
(52) U.S. Cl.
CPC .................... *G11B 33/02* (2013.01)
(58) Field of Classification Search
None
See application file for complete search history.

(56) References Cited

U.S. PATENT DOCUMENTS

| | | | |
|---|---|---|---|
| 6,256,173 B1* | 7/2001 | Chee | G11B 33/08 |
| 6,490,138 B1* | 12/2002 | Prater | G11B 33/08 |
| 6,556,387 B1* | 4/2003 | Misso | G11B 5/5521 |
| 7,379,273 B2* | 5/2008 | Culver | G11B 5/5569 |
| 7,513,030 B2* | 4/2009 | Aoyagi | G11B 5/4813 29/603.03 |
| 10,192,575 B1* | 1/2019 | Resh | G11B 21/02 |
| 10,891,980 B1* | 1/2021 | Keshavan | G11B 25/043 |
| 12,087,324 B2* | 9/2024 | Ito | G11B 33/022 |
| 2002/0024770 A1* | 2/2002 | Hong | G11B 5/5565 |
| 2003/0044096 A1 | 3/2003 | Koyama et al. | |
| 2008/0186630 A1* | 8/2008 | Hur | G11B 5/4813 |
| 2014/0368951 A1* | 12/2014 | Lee | F16C 33/1085 384/107 |
| 2016/0365105 A1* | 12/2016 | Kimura | F16F 15/08 |
| 2018/0358039 A1* | 12/2018 | Keshavan | G11B 5/5521 |
| 2020/0302958 A1* | 9/2020 | Hayasaka | G11B 5/4813 |
| 2022/0262403 A1* | 8/2022 | Ito | B22D 17/00 |
| 2023/0335156 A1* | 10/2023 | Ohnuma | F16C 19/08 |
| 2023/0420003 A1* | 12/2023 | Kuribara | G11B 25/043 |

FOREIGN PATENT DOCUMENTS

| | | | |
|---|---|---|---|
| EP | 1336968 A1 * | 8/2003 | G11B 33/08 |
| JP | 2002324373 A * | 11/2002 | F16C 19/08 |
| JP | 2003-077237 A | 3/2003 | |

\* cited by examiner

*Primary Examiner* — William J Klimowicz
(74) *Attorney, Agent, or Firm* — Chrisman Gallo Tochtrop LLC

(57) ABSTRACT

A base serves as a part of a housing of a hard disk drive device. The base includes a bottom plate part and a pivot shaft extending in a top-bottom direction. The pivot shaft includes a first shaft part formed integrally with the bottom plate part, and a second shaft part fixed to the first shaft part in a lower end region, a cover of the hard disk drive device being attached to the second part shaft in an upper end region.

10 Claims, 15 Drawing Sheets

BASE AND HARD DISK DRIVE DEVICE

CROSS-REFERENCE TO RELATED APPLICATIONS

This application claims the benefit of priority to Japanese Patent Application Number 2023-018204 filed on Feb. 9, 2023. The entire contents of the above-identified application are hereby incorporated by reference.

TECHNICAL FIELD

The disclosure relates to a base and a hard disk drive device.

BACKGROUND

A technique is known in which a base and a pivot shaft are prepared as separate members and the pivot shaft is fixed to the base (JP 2003-77237 A). A technique in which a base and a pivot shaft are integrally formed is also known (U.S. Pat. No. 10,891,980).

SUMMARY

In recent years, the demand for near-line type hard disk drive devices has increased, and there has been an increasing trend toward higher capacity and lower power consumption in hard disk drive devices.

In order to increase the capacity of a hard disk drive device, a height of a housing thereof may be increased. As the height of the housing becomes greater, a length of a pivot shaft becomes increases. In this case, since the pivot shaft is a member having a length in an axial direction longer than a length in a radial direction, a blow hole is likely to occur at a distal end portion in the axial direction.

On the other hand, in order to reduce power consumption of the hard disk drive device, helium gas may be contained in an interior space of the housing. In this case, sealability of the housing needs to be ensured.

In the technique described in JP 2003-77237 A, since the base and the pivot shaft are prepared as separate members, the occurrence of blow holes in the pivot shaft can be easily suppressed, but there is the concern that the sealability of the housing deteriorates.

In the technique described in U.S. Pat. No. 10,891,980, since the base and the pivot shaft are integrally formed, while it is easy to ensure the sealability of the housing, there is the concern that a blow hole may be generated in the pivot shaft.

The disclosure has been made in view of the above-described problems, and an object of the disclosure is to provide a technique capable of preventing the occurrence of blow holes in a pivot shaft and improving the sealability of a base.

In order to achieve the above-described object, a base according to the disclosure is a base serving as a part of a housing of a hard disk drive device. The base includes a bottom plate part and a pivot shaft extending in a top-bottom direction. The pivot shaft includes a first shaft part formed integrally with the bottom plate part, and a second shaft part fixed to the first shaft part in a lower end region, a cover of the hard disk drive device being attached to the second shaft part in an upper end region.

According to the base of the disclosure, occurrence of blow holes in the pivot shaft can be prevented and the sealability of the base can be improved.

BRIEF DESCRIPTION OF DRAWINGS

FIG. 3A illustrates an entire pivot shaft, and FIG. 3B illustrates an enlarged part of the pivot shaft.

FIG. 7A illustrates an entire pivot shaft, and FIG. 7B illustrates an enlarged part of the pivot shaft.

FIG. 13A illustrates an entire pivot shaft, and FIG. 13B illustrates an enlarged part of the pivot shaft and a bottom plate part.

DESCRIPTION OF EMBODIMENTS

Figure 1:
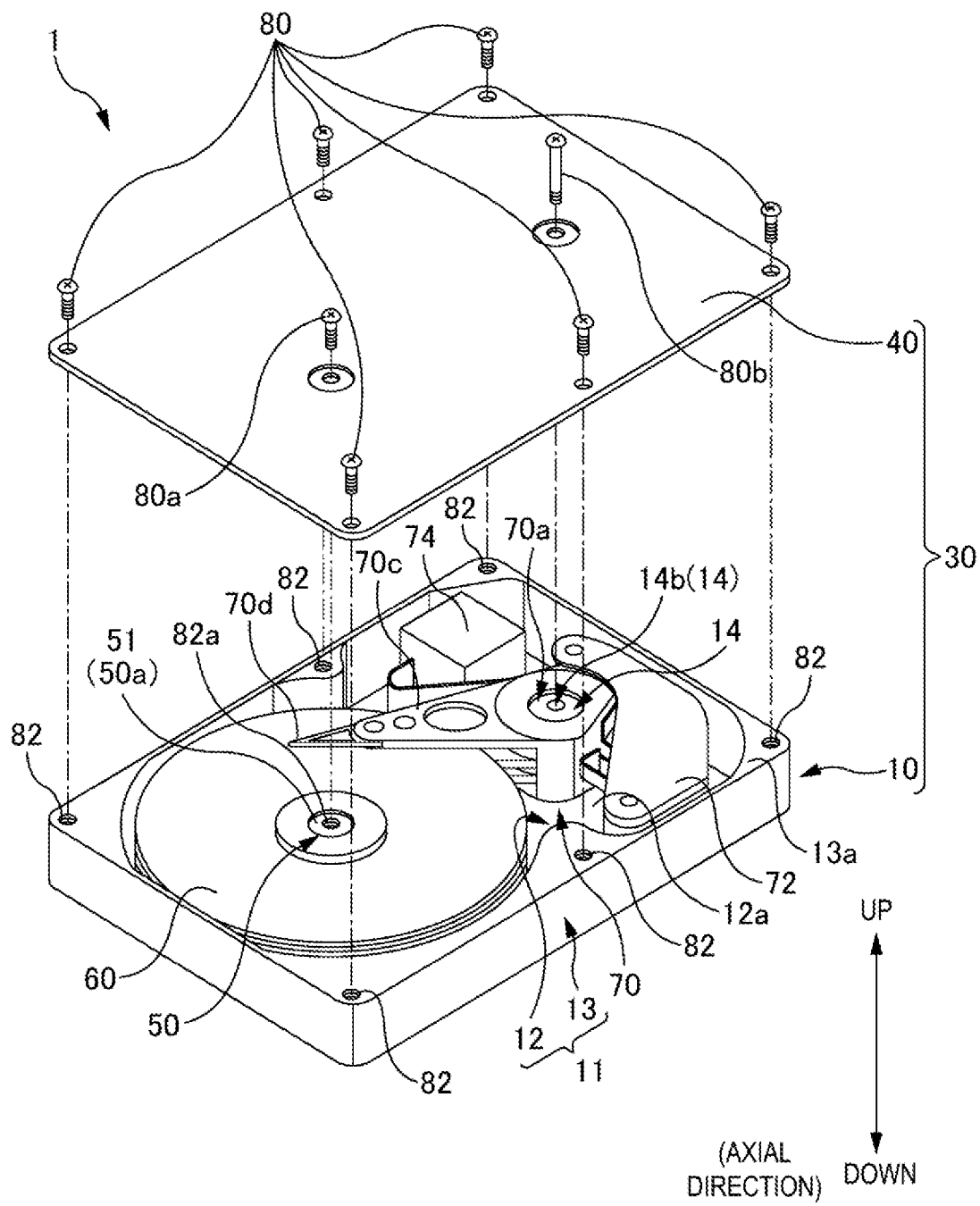
FIG. 1 is a perspective view illustrating an example of a hard disk drive device according to a first embodiment.

Hereinafter, embodiments of the disclosure will be described with reference to the drawings. The same or equivalent components and members illustrated in the drawings are denoted by the same reference numerals, and duplicate description will be omitted as appropriate.

First Embodiment

Figure 2:
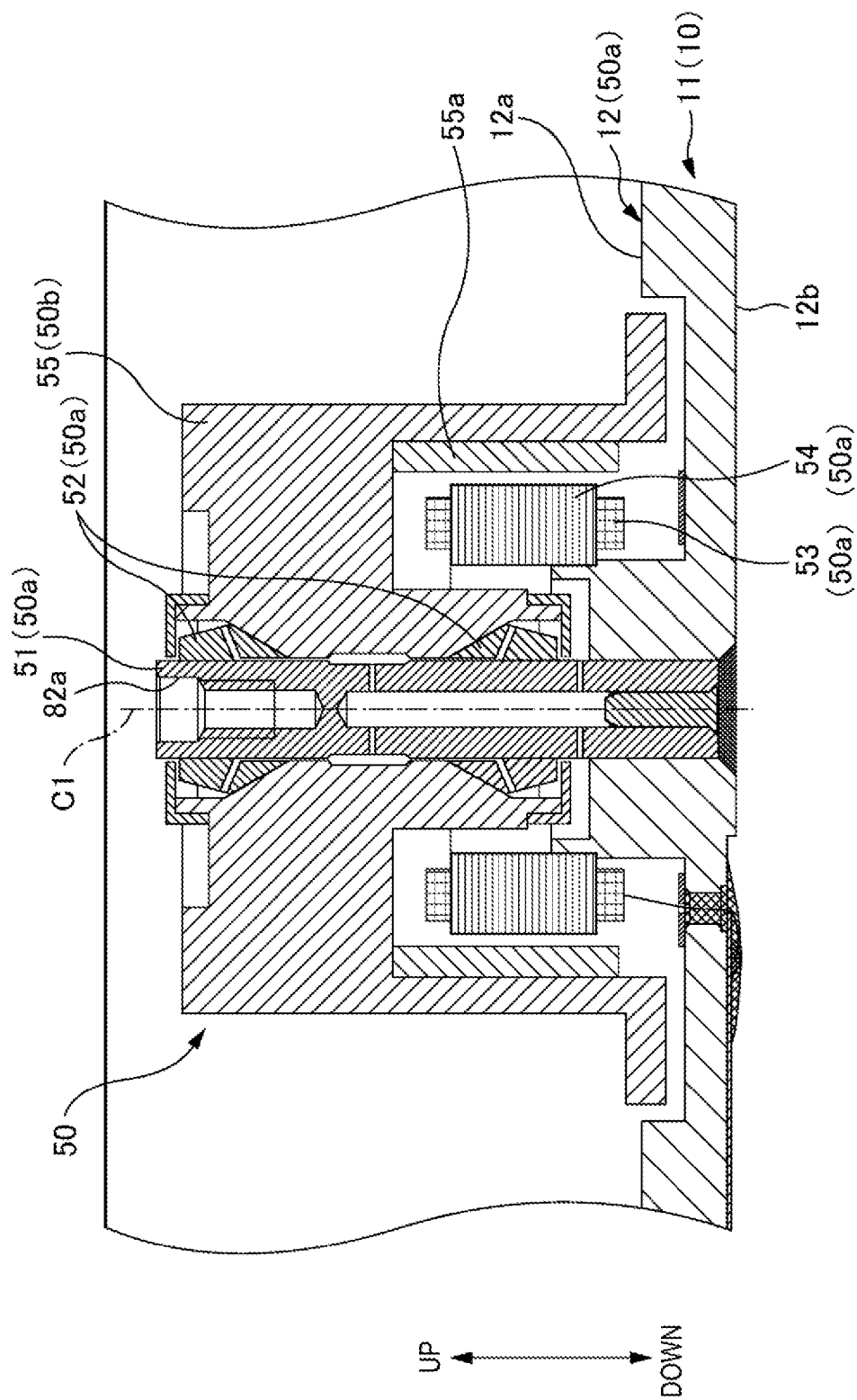
FIG. 2 is a partial cross-sectional view illustrating an example of a spindle motor used for the hard disk drive device of FIG. 1.

FIG. 1 is a perspective view illustrating an example of a hard disk drive device 1 according to a first embodiment. FIG. 2 is a partial cross-sectional view illustrating an example of a spindle motor 50 used for the hard disk drive device 1 of FIG. 1. FIGS. 3A and 3B include partial cross-sectional views illustrating an example of a base 10 used for the hard disk drive device 1 of FIG. 1, FIG. 3A illustrates an entire pivot shaft 14, and FIG. 3B illustrates an enlarged part of the pivot shaft 14. FIG. 4 is a flowchart showing an example of a manufacturing method for the base 10 used for the hard disk drive device 1 of FIG. 1.

Hereinafter, a direction parallel to a central axis line C1 (FIG. 2) of a motor shaft 51 and a central axis line C2 (FIGS. 3A and 3B and the like) of the pivot shaft 14 is referred to as an axial direction. A direction perpendicular to an axial direction is referred to as a radial direction. Directions around the central axis line C1 of the motor shaft 51 and around the central axis line C2 of the pivot shaft 14 are referred to as circumferential directions. For convenience of description, it is assumed that the axial direction is defined as a top-bottom direction, and a side of a bottom plate part 12 of the base 10 from the motor shaft 51 and the pivot shaft 14 is a bottom side and the opposite side is a top side. The top-bottom direction is not necessarily a vertical direction. The top-bottom direction may be a horizontal direction, a vertical direction, or another direction depending on an installation location or orientation of the hard disk drive device 1.

Hard Disk Drive Device 1

As illustrated in FIG. 1, the hard disk drive device 1 includes a housing 30, the spindle motor 50, a recording disk 60, an access part 70, a voice coil motor 72, and a connector 74.

The housing 30 includes the base 10 and a cover 40 attached to the base 10. The cover 40 is a plate-like member closing an open surface of the base 10. The cover 40 is fastened to the base 10 using male screws 80. A sealing means (not illustrated) is provided between the cover 40 and the base 10. With this, the cover 40, together with the base 10, forms the housing 30 having a hermetically sealed interior space.

The interior space of the housing 30 contains helium gas as a gas having a lower density than air. The interior space may be filled with, for example, nitrogen gas or a mixed gas of helium and nitrogen. The interior space can contain another gas having a lower density than air. The interior space may also accommodate air. The spindle motor 50, the recording disk 60, the access part 70, the voice coil motor 72, and the connector 74 are accommodated in the interior space.

A plurality of the recording disks 60 are provided and supported by a rotor 55 of a rotating part 50b of the spindle motor 50 such that the disk surfaces face each other. A gap is formed between each of the recording disks 60.

The access part 70 is supported by the pivot shaft 14, records data on the recording disks 60 and reads data recorded on the recording disks 60. To be more specific, the access part 70 includes a bearing device 70a, a swing arm 70c, and a magnetic head 70d.

The bearing device 70a is attached to the pivot shaft 14 provided at the bottom plate part 12 of the base 10, and swingably supports a plurality of the swing arms 70c disposed at the gap between each of the recording disks 60. A magnetic head 70d is provided at a distal end part of the swing arm 70c. The magnetic head 70d is a member for imparting magnetism to the recording disks 60 and reading magnetism from the recording disks 60. The voice coil motor 72 is electrically connected to a printed circuit board (not illustrated) via the connector 74. The voice coil motor 72 supplies a driving force to the swing arms 70c, thereby positioning the magnetic heads 70d with respect to the recording disks 60.

When the rotor 55 of the spindle motor 50 rotates, the recording disks 60 also rotate. In this state, when the swing arms 70c swing, the magnetic heads 70d move over the rotating recording disks 60. Then, the magnetic heads 70d impart magnetism to the recording disks 60 and read magnetism from the recording disks 60. Accordingly, the magnetic heads 70d record data on the recording disks 60 and read data recorded on the recording disks 60.

Spindle Motor 50

The spindle motor 50 is used for the hard disk drive device 1. The spindle motor 50 includes a stationary part 50a supported by the base 10 and the rotating part 50b that rotates with respect to the stationary part 50a. As illustrated in FIGS. 1 and 2, the stationary part 50a includes a region of the bottom plate part 12 of the base 10, a motor shaft 51, bearing members 52, coils 53, and stator cores 54. The rotating part 50b includes a rotor 55 and a rotor magnet 55a.

The motor shaft 51 is a component made of a metal and has a cylindrical shape and is fixed to a region of the bottom plate part 12 through press fitting or the like as illustrated in FIG. 2. An upper side end part of the motor shaft 51 includes a screw hole 82a. The screw hole 82a accommodates a male screw 80a (FIG. 1). The cover 40 is fastened to the motor shaft 51 by screwing the male screw 80a into a female screw formed in the screw hole 82a.

A pair of bearing members 52 having a conical shape are fixed to an outer peripheral surface of the motor shaft 51, and the rotor 55 is rotatably supported at the pair of bearing members 52. The motor shaft 51 is inserted inside the rotor 55 in the radial direction, and the rotor 55 faces the motor shaft 51 and the pair of bearing members 52 with a minute gap therebetween. The minute gap between the rotor 55 and the pair of bearing members 52 is filled with lubricant, which is not illustrated, to form a so-called fluid dynamic bearing. The plurality of recording disks 60 are installed at an outer side of the rotor 55 in the radial direction (see FIG. 1).

As illustrated in FIG. 2, the rotor magnet 55a is disposed in the rotor 55. The rotor magnet 55a is a tubular member magnetized such that adjacent portions alternately have opposite polarities, such as SNSN, in the circumferential direction. The rotor magnet 55a is attached across the entire periphery of the inner surface of the rotor 55.

The stator cores 54 are fixed to the bottom plate part 12. The stator cores 54 are formed by laminating a plurality of soft magnetic materials (for example, electromagnetic steel plates) having a thin plate shape in the axial direction, have annular shapes, and include a plurality of pole teeth protruding outward in the radial direction. The plurality of pole teeth are provided at equal intervals in the circumferential direction, and the coil 53 is wound around each of the pole teeth. The inner circumferential surface of the rotor magnet 55a faces the outer circumferential surface of the pole teeth of the stator core 54 with a gap therebetween.

By causing a current to flow through the coil 53 and switching the polarity, magnetic attractive forces and magnetic repulsive forces generated between the rotor magnet 55a and the pole teeth of the stator core 54 are switched. As a result, the rotor 55 rotates about the motor shaft 51.

When the rotor 55 rotates at a high speed, the lubricant filling the minute gap between the pair of bearing members 52 and the rotor 55 is pressurized by dynamic pressure generating grooves, which are not illustrated. As a result, dynamic pressure is generated between the pair of bearing members 52 and the rotor 55, and due to the generated dynamic pressure, the rotor 55 rotates while being supported in non-contact with the motor shaft 51. That is, the rotor 55 rotates while being supported in a non-contacting state with the motor shaft 51.

Base 10

Figure 3:
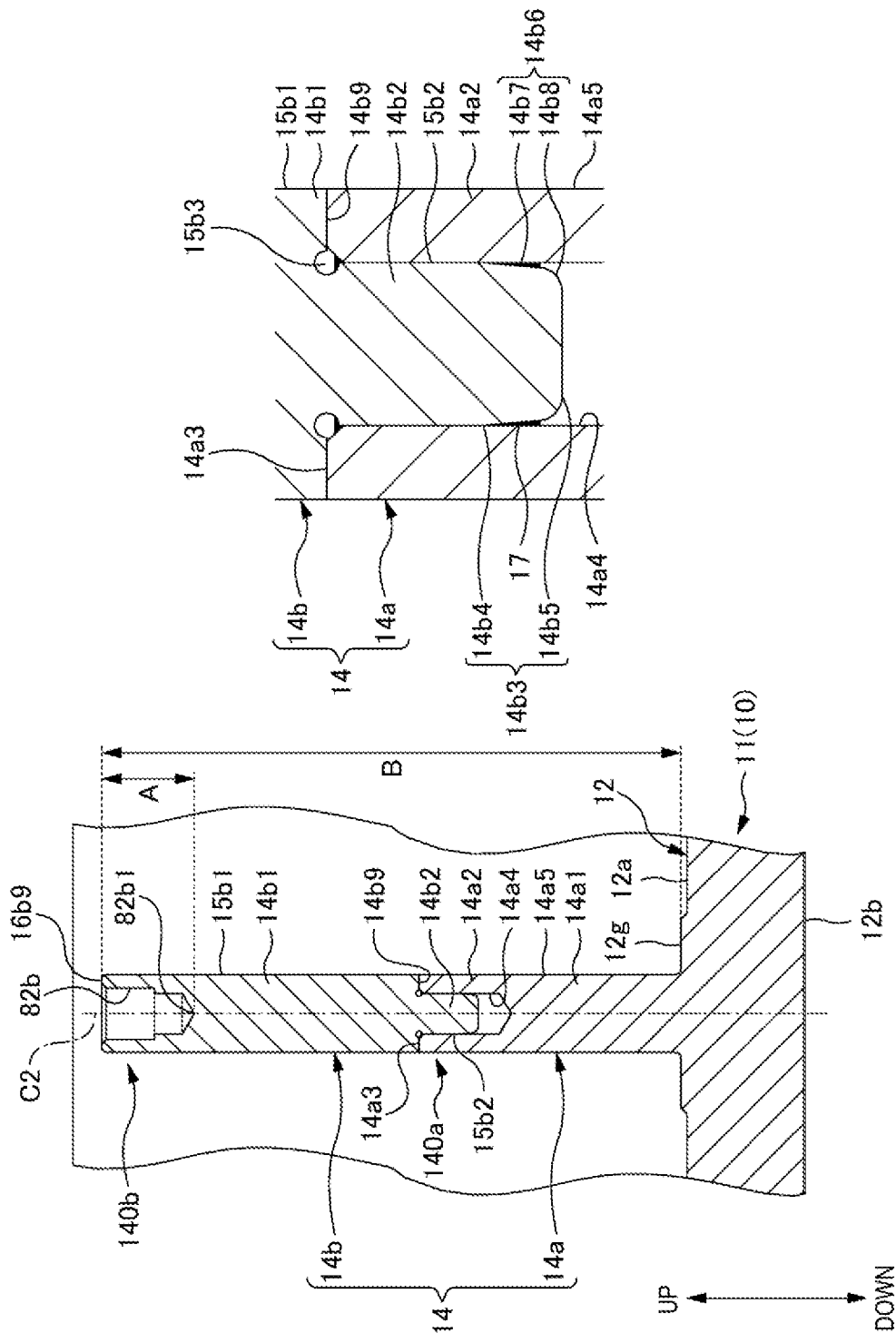
FIGS. 3A and 3B include partial cross-sectional views illustrating an example of a base used in the hard disk drive device of FIG. 1.
Figure 4:
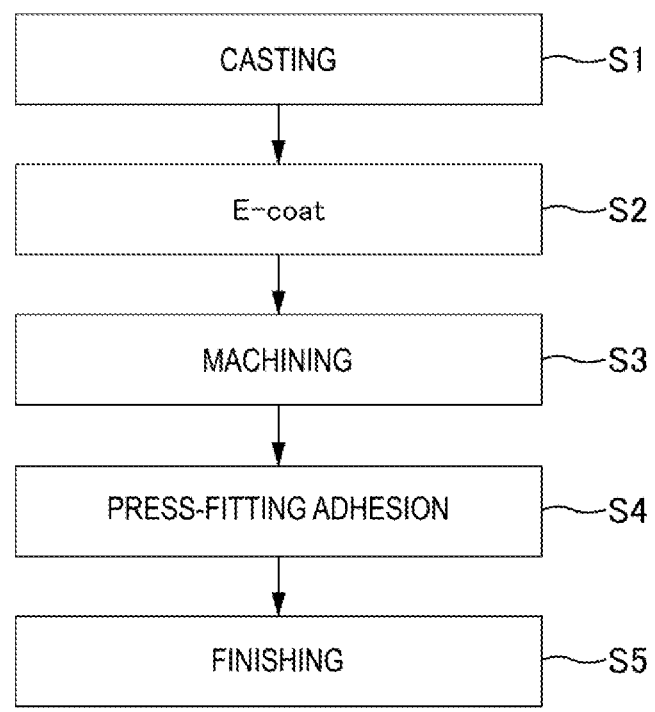
FIG. 4 is a flowchart showing an example of a manufacturing method for the base used for the hard disk drive device of FIG. 1.

As illustrated in FIGS. 1 and 3, the base 10 includes a base main body part 11 and the pivot shaft 14. The base 10 is a component as a part of the housing 30 of the hard disk drive device 1.

As illustrated in FIG. 1, the base main body part 11 includes the bottom plate part 12 and a sidewall part 13. The base main body part 11 has a substantially rectangular parallelepiped box-like shape with a bottom having an open upper surface, and is manufactured by die casting a metal, such as aluminum.

The bottom plate part 12 is disposed at the lower side of the base main body part 11 and has a rectangular plate shape having short sides and long sides. The bottom plate part 12 may have a square plate shape with four sides having the same length. The sidewall part 13 extending in a direction orthogonal to the bottom plate part 12 (that is, upward) is formed around the entire circumference of the bottom plate part 12 as illustrated in FIG. 1. The sidewall part 13 includes a sidewall upper surface 13a facing upward.

As illustrated in FIG. 1, the sidewall part 13 includes a plurality of screw holes 82 in the sidewall upper surface 13a. The screw holes 82 accommodate the male screws 80. The cover 40 is fastened to the base main body part 11 by screwing the male screws 80 into female screws formed in the screw holes 82.

The bottom plate part 12 includes a bottom plate upper surface 12a facing upward and a bottom plate lower surface 12b facing downward as illustrated in FIGS. 3A and 3B. In addition, the bottom plate part 12 includes a mounting surface 12g facing upward in a region around the pivot shaft 14 in the bottom plate upper surface 12a. The mounting surface 12g is a partial region of the bottom plate upper surface 12a and is formed to be slightly higher in the upward direction than the other region of the bottom plate upper surface 12a. As will be described below, an electrodeposition coating film is formed on the entire base main body part 11, and the mounting surface 12g is a region with the electrodeposition coating film removed through machining such as cutting. The bearing device 70a of the access part 70 is placed on the mounting surface 12g.

As illustrated in FIGS. 3A and 3B, the pivot shaft 14 is a component extending in the top-bottom direction and supports the bearing device 70a. The pivot shaft 14 is a cylindrical component made of metal (for example, aluminum or stainless steel (SUS)).

The pivot shaft 14 includes a first shaft part 14a extending in the top-bottom direction at the lower side, that is, at the bottom plate part 12 side, and a second shaft part 14b extending in the top-bottom direction at the upper side, that is, above the first shaft part 14a.

The first shaft part 14a is formed integrally with the bottom plate part 12. The first shaft part 14a includes a first base portion 14a1 extending upward from the bottom plate part 12, an upward extending portion 14a2 extending upward from the first base portion 14a1, and a hole portion 14a4 recessed downward from an upper portion surface 14a3 of the upward extending portion 14a2. The first shaft part 14a is manufactured integrally with the bottom plate part 12 through casting.

The second shaft part 14b is fixed to the first shaft part 14a in a lower end region 140a, and the cover 40 of the hard disk drive device 1 is attached at an upper end region 140b. To be specific, the second shaft part 14b includes a second base portion 14b1, the cover 40 being attached thereto, and a pin portion 14b2 extending downward from a lower end surface 14b9 of the second base portion 14b1 and having a smaller diameter than the second base portion 14b1. The second shaft part 14b includes a reservoir groove 15b3 in a radially inner portion of the lower end surface 14b9 in the second base portion 14b1. The second shaft part 14b is manufactured separately from the first shaft part 14a. The second shaft part 14b is manufactured through cutting from the same material as the material of the first shaft part 14a (for example, aluminum or stainless steel (SUS)). A method for manufacturing the second shaft part 14b is not limited to cutting, and the second shaft part 14b may be manufactured through, for example, casting or forging.

In the present embodiment, an outer surface 14a5 of the first base portion 14a1 (hereinafter referred to as a first base portion outer surface 14a5) and an outer surface 15b1 of the second base portion 14b1 (hereinafter referred to as a second base portion outer surface 15b1) are formed to be flush with each other. That is, the first base portion 14a1 and the second base portion 14b1 have identical or substantially identical outer diameters. Accordingly, the bearing device 70a is supported by the first base portion outer surface 14a5 and the second base portion outer surface 15b1 (FIG. 1). The second base portion 14b1 may have a smaller outer diameter than the first base portion 14a1. In this case, the bearing device 70a is supported on the first base portion outer surface 14a5.

The pin portion 14b2 has an outer diameter slightly larger than an inner diameter of the hole portion 14a4. Accordingly, the pin portion 14b2 is press-fitted into the hole portion 14a4, and the second shaft part 14b is fixed to the first shaft part 14a. In a state of the pin portion 14b2 being press-fitted into the hole portion 14a4, the lower end surface 14b9 of the second base portion 14b1 comes into contact with the upper portion surface 14a3 of the upward extending portion 14a2.

Although not illustrated, the first shaft part 14a or the second shaft part 14b may include a connection passage connecting the interior space and an exterior space of the hole portion 14a4 with the pin portion 14b2 being press-fitted into the hole portion 14a4. As an example, when the connection passage is provided in the first shaft part 14a, the connection passage may be formed to penetrate the upward extending portion 14a2 in the radial direction. In addition, as an example, when the connection passage is provided in the second shaft part 14b, the connection passage may be formed to penetrate the second shaft part 14b in the top-bottom direction.

As illustrated in FIG. 3B, the pin portion 14b2 includes a tapered portion 14b6 in a distal end region 14b3 of the pin portion 14b2. The tapered portion 14b6 is formed such that the distance between the tapered portion and the hole portion 14a4 increases from a proximal end 14b4 toward a distal end 14b5 of the distal end region 14b3. In the present embodiment, the distal end region 14b3 is a lower region of the pin portion 14b2. The position of the proximal end 14b4 of the distal end region 14b3 may be appropriately changed in accordance with the press-fit length of a pin portion outer surface 15b2 of the pin portion 14b2 (the length of a portion of the pin portion outer surface 15b2 in contact with the hole portion 14a4).

In the present embodiment, the tapered portion 14b6 includes a linear portion 14b7 in an upper region and a curved portion 14b8 in a lower region. A linear portion 14b7 extends obliquely downward and radially inward from the proximal end 14b4. The curved portion 14b8 connects the linear portion 14b7 and the distal end 14b5 and includes a convexly curved surface. As an example, the linear portion 14b7 may include an inclination angle of 3° to 10° with respect to the central axis line C2 of the pivot shaft 14. The tapered portion 14b6 may not include the curved portion 14b8, and in this case, the tapered portion may include another linear portion (not illustrated) connecting the linear portion 14b7 and the distal end 14b5. The other linear portion may have an inclination angle with respect to the central axis line C2 larger than the inclination angle of the linear portion 14b7, and the inclination angle may be 45° as an example.

In the present embodiment, a thermosetting adhesive 17 (an example of an adhesive) is interposed between the pin portion 14b2 and the hole portion 14a4 (FIG. 3B). The thermosetting adhesive 17 is at least partially thinly interposed between the pin portion 14b2 and the hole portion 14a4 in the top-bottom direction. As illustrated in FIG. 3B, a part of the thermosetting adhesive 17 may be accumulated in the reservoir groove 15b3 or may be interposed between the tapered portion 14b6 and the hole portion 14a4. Examples of the thermosetting adhesive 17 include a thermosetting epoxy resin and an acrylic resin. In addition, it is preferable that the viscosity of the thermosetting adhesive 17 be equal to or less than 7 Pa·s, because the effect of impregnation into a fine gap is expected.

The second shaft part 14b includes, in the second base portion 14b1, an upper end surface 16b9 as a surface facing upward. A screw hole 82b is formed in the upper end surface 16b9. The screw hole 82b accommodates a male screw 80b (FIG. 1). The cover 40 is fastened to the pivot shaft 14 by screwing the male screw 80b into a female screw formed in the screw hole 82b. When the screw hole 82b is a blind hole, an axial length A from a bottom portion 82b1 of the screw hole 82b to the upper end surface 16b9 is equal to or less than one fourth, and more preferably equal to or less than one fifth of an axial length B from the mounting surface 12g to the upper end surface 16b9.

Manufacturing of Base 10

1. Casting (S1)

Molten aluminum is injected into each of a die casting mold having a cavity corresponding to the shape of the base main body part 11 and the first shaft part 14a, and a die casting mold having a cavity corresponding to the shape of the second shaft part 14b. After the molten metal cools and solidifies in the cavity, the die casting mold is opened to remove the product, and the remaining and solidified portion in the runner leading to a gate of the die casting mold is cut. The second shaft part 14b may be manufactured by cutting a desired material such as aluminum or stainless steel (SUS), or may be manufactured by forging. The screw hole 82b of the second shaft part 14b may be formed in S1, or may be formed in S5, which will be described below.

2. E-Coat (S2)

While the product (a semi-finished product of the base main body part 11 and the first shaft part 14a) die-cast in S1 is immersed in, for example, an epoxy-resin coating material, an electric current is caused to flow between the coating material and the product. Accordingly, the coating material is adhered to the surface of the product after die casting. In this way, an electrodeposition coating film is formed on the surface of the product.

3. Machining (S3)

Next, machining is performed on the product having the electrodeposition coating film formed in S2. To be specific, a part of the region of the bottom plate upper surface 12a in the product subjected to electrodeposition coating is cut to remove the electrodeposition coating film in the region, thereby forming the mounting surface 12g. In S3, assuming that the first base portion outer surface 14a5 and the second base portion outer surface 15b1 are subjected to finish machining in S5, which will be described below, the first base portion outer surface 14a5 and the second base portion outer surface 15b1 may be machined in a roughly cut state. After S3, the base main body part 11, the first shaft part 14a, and the second shaft part 14b are completed.

4. Adhesive Application and Press-Fitting Adhesion (S4)

Next, the second shaft part 14b prepared in separate steps (for example, cutting, casting, or forging) is fixed to the base main body part 11 and the first shaft part 14a completed through steps from S1 to S3 to complete the base 10. To be specific, first, the thermosetting adhesive 17 is applied to the vicinity of the upper portion of the hole portion 14a4 of the first shaft part 14a. Subsequently, by applying a downward force to the upper end surface 16b9 of the second shaft part 14b, the pin portion 14b2 is pushed into the hole portion 14a4 downward from above. At this time, the thermosetting adhesive 17 functions as a lubricant between the pin portion 14b2 and the hole portion 14a4. Accordingly, the pin portion 14b2 is inserted, that is, press-fitted into the hole portion 14a4 in the form of an interference fit. After the pin portion 14b2 is press-fitted into the hole portion 14a4, heating treatment is performed to cure the thermosetting adhesive 17. Accordingly, the second shaft part 14b is firmly fixed to the first shaft part 14a.

As the pin portion 14b2 advances below the hole portion 14a4, the thermosetting adhesive 17 is scraped downward and is at least partially thinly spread between the pin portion 14b2 and the hole portion 14a4. As a result, the thermosetting adhesive 17 is at least partially interposed in the top-bottom direction between the pin portion 14b2 and the hole portion 14a4 and is cured. That is, the thermosetting adhesive 17 may be partially interposed or entirely interposed between the pin portion 14b2 and the hole portion 14a4. "Press-fitting adhesion" means that the pin portion 14b2 is fixed to the hole portion 14a4 by press-fitting and fixed using the adhesive action of the thermosetting adhesive 17.

5. Finishing (S5)

Finally, finishing is performed in order to improve the accuracy in the outer diameters of the first base portion outer surface 14a5 and the second base portion outer surface 15b1, the accuracy in the perpendicularity between the first base portion outer surface 14a5 and the mounting surface 12g, and the degree of parallelism between the mounting surface 12g and the upper end surface 16b9 of the second shaft part 14b. Here, "accuracy in the outer diameters" means a difference in outer diameter between the first base portion outer surface 14a5 and the second base portion outer surface 15b1. To improve the accuracy in the outer diameters means to bring the difference in outer diameter closer to zero. In addition, "perpendicularity" means the difference in actual angle between the first base portion outer surface 14a5 and the mounting surface 12g relative to the right angle (i.e., 90°). To improve the accuracy in perpendicularity means to bring the difference closer to zero. "Degree of parallelism" is a difference in the actual angle between the mounting surface 12g and the upper end surface 16b9 of the second shaft part 14b relative to parallelism (i.e., an angle difference of zero). To improve the accuracy in the degree of parallelism means to bring the difference closer to zero. To be more specific, after step of S4, machining such as cutting is performed on the first base portion outer surface 14a5 and the second base portion outer surface 15b1, the first base portion outer surface 14a5 and the mounting surface 12g, and the mounting surface 12g and the upper end surface 16b9 of the second shaft part 14b, thereby improving the accuracy in the outer diameters, the accuracy in the perpendicularity, and accuracy in the degree of parallelism. The base 10 is completed through S1 to S5 in this manner.

The hard disk drive device 1 is completed by assembling the motor shaft 51, the bearing members 52, the coils 53, the stator cores 54, the rotor 55, the access part 70, and the like to the base 10 completed through above-described S1 to S5, and fastening the cover 40 to the base 10.

Modifications

Next, a modification of the first embodiment will be described. The base 10 according to the present modification is different from the base 10 according to the first embodiment in terms of the fixing method for the first shaft part 14a and the second shaft part 14b. Hereinafter, configurations having the same or similar functions as the functions of the base 10 according to the first embodiment are denoted by the same reference signs, and descriptions are omitted and only different components are described.

Figure 5:
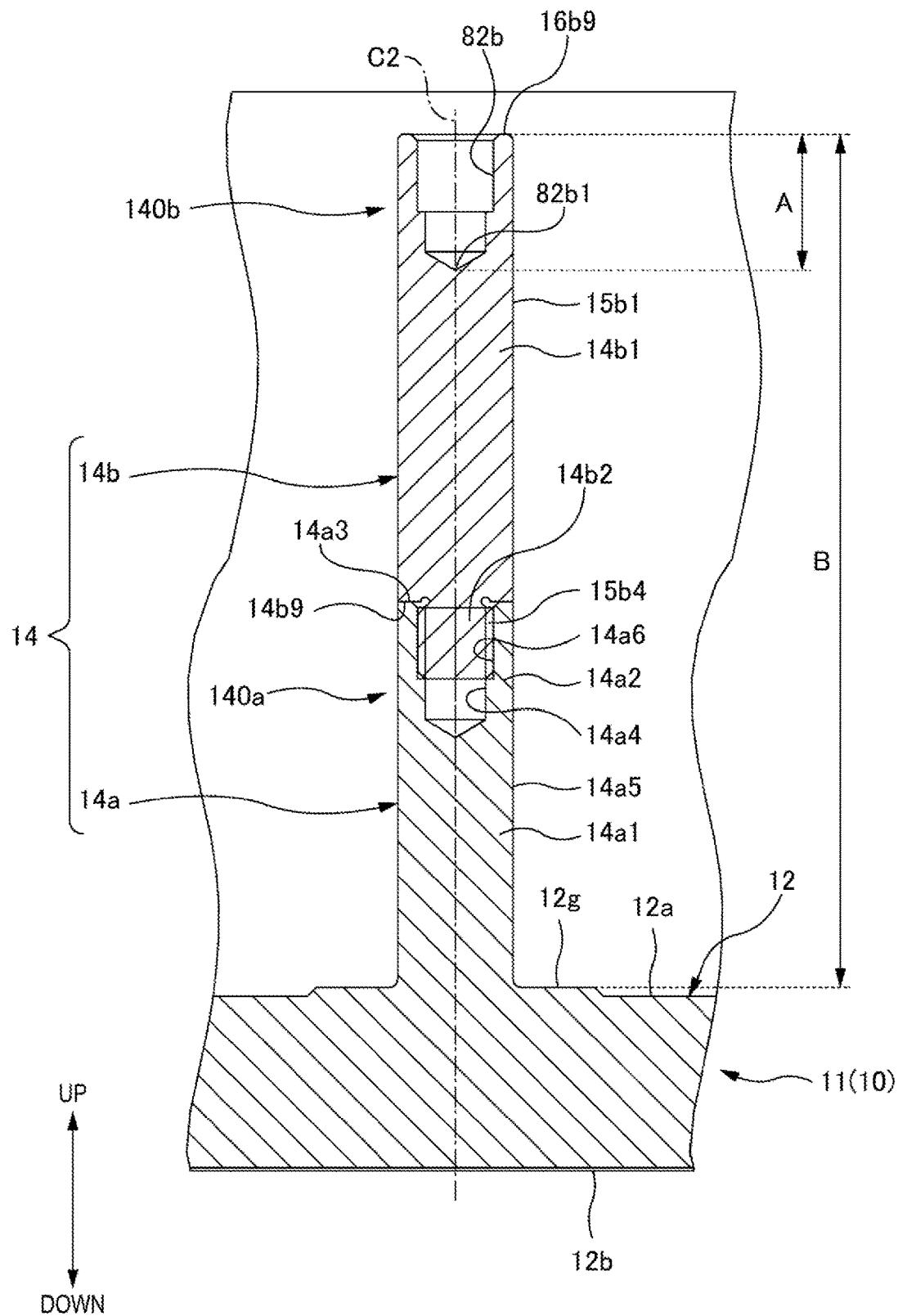
FIG. 5 is a partial cross-sectional view illustrating a modification of the base illustrated in FIGS. 3A and 3B.

As illustrated in FIG. 5, the first shaft part 14a includes a screw-coupled portion 14a6 recessed downward from the upper portion surface 14a3 of the upward extending portion 14a2. The screw-coupled portion 14a6 is a female screw formed in the hole portion 14a4.

In addition, the second shaft part 14b extends downward from the second base portion 14b1 and includes a screw coupling portion 15b4 having a smaller diameter than the second base portion 14b1. The screw coupling portion 15b4 is a male screw formed on the pin portion 14b2. The screw coupling portion 15b4 is screw-fixed (i.e., fixed by the action of a screw) to the screw-coupled portion 14a6. That is, the second shaft part 14b is screw-fixed (also referred to as screwed) to the first shaft part 14a. The screwing means that a male screw and a female screw are fitted into each other.

When the screw hole 82b is a blind hole, an axial length A from a bottom portion 82b1 of the screw hole 82b to the upper end surface 16b9 is equal to or less than one fourth, and more preferably equal to or less than one fifth of an axial length B from the mounting surface 12g to the upper end surface 16b9.

Manufacturing of Base 10

Figure 6:
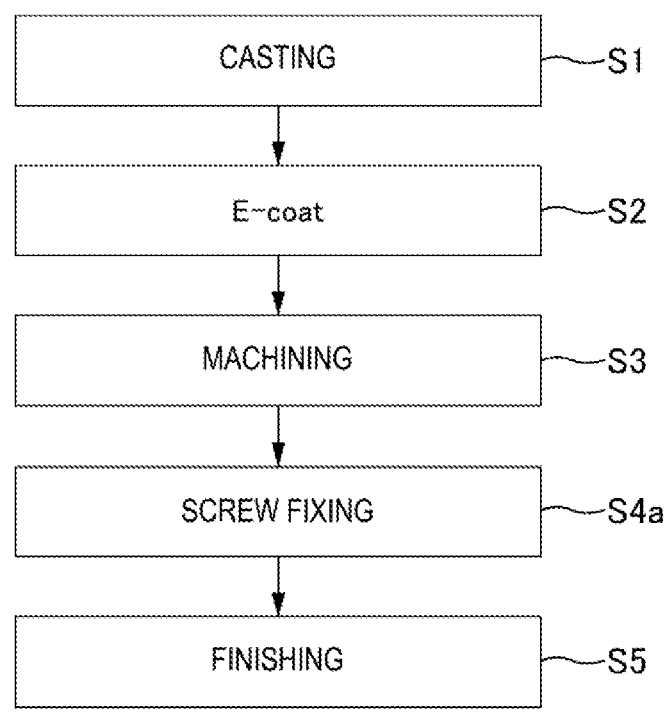
FIG. 6 is a flowchart showing an example of a manufacturing method for the base illustrated in FIG. 5.

As illustrated in FIG. 6, in the step of screw fixing (S4a), the second shaft part 14b prepared in a separate step is screw-fixed to the base main body part 11 and the first shaft part 14a completed through steps from S1 to S3 to complete the base 10. To be specific, the screw coupling portion 15b4 of the second shaft part 14b is screwed to the screw-coupled portion 14a6 of the first shaft part 14a.

In S4a, the thermosetting adhesive 17 may be applied to the vicinity of the upper portion of the hole portion 14a4 of the first shaft part 14a. Subsequently, by rotating the second shaft part 14b with respect to the first shaft part 14a, the pin portion 14b2 (the screw coupling portion 15b4) is screwed into the hole portion 14a4 (the screw-coupled portion 14a6) downward from above. After the pin portion 14b2 is screwed into the hole portion 14a4, heating treatment is performed to cure the thermosetting adhesive 17. Accordingly, the second shaft part 14b is firmly fixed to the first shaft part 14a. The thermosetting adhesive 17 may be partially interposed or entirely interposed between the pin portion 14b2 and the hole portion 14a4.

Second Embodiment

Next, a base 10 according to a second embodiment of the disclosure will be described. The base 10 according to the second embodiment is different from the base 10 according to the first embodiment in terms of the configuration of the first shaft part 14a and the second shaft part 14b. Hereinafter, configurations having the same or similar functions as the functions of the base 10 according to the first embodiment are denoted by the same reference signs, and descriptions are omitted and only different components are described.

Figure 7:
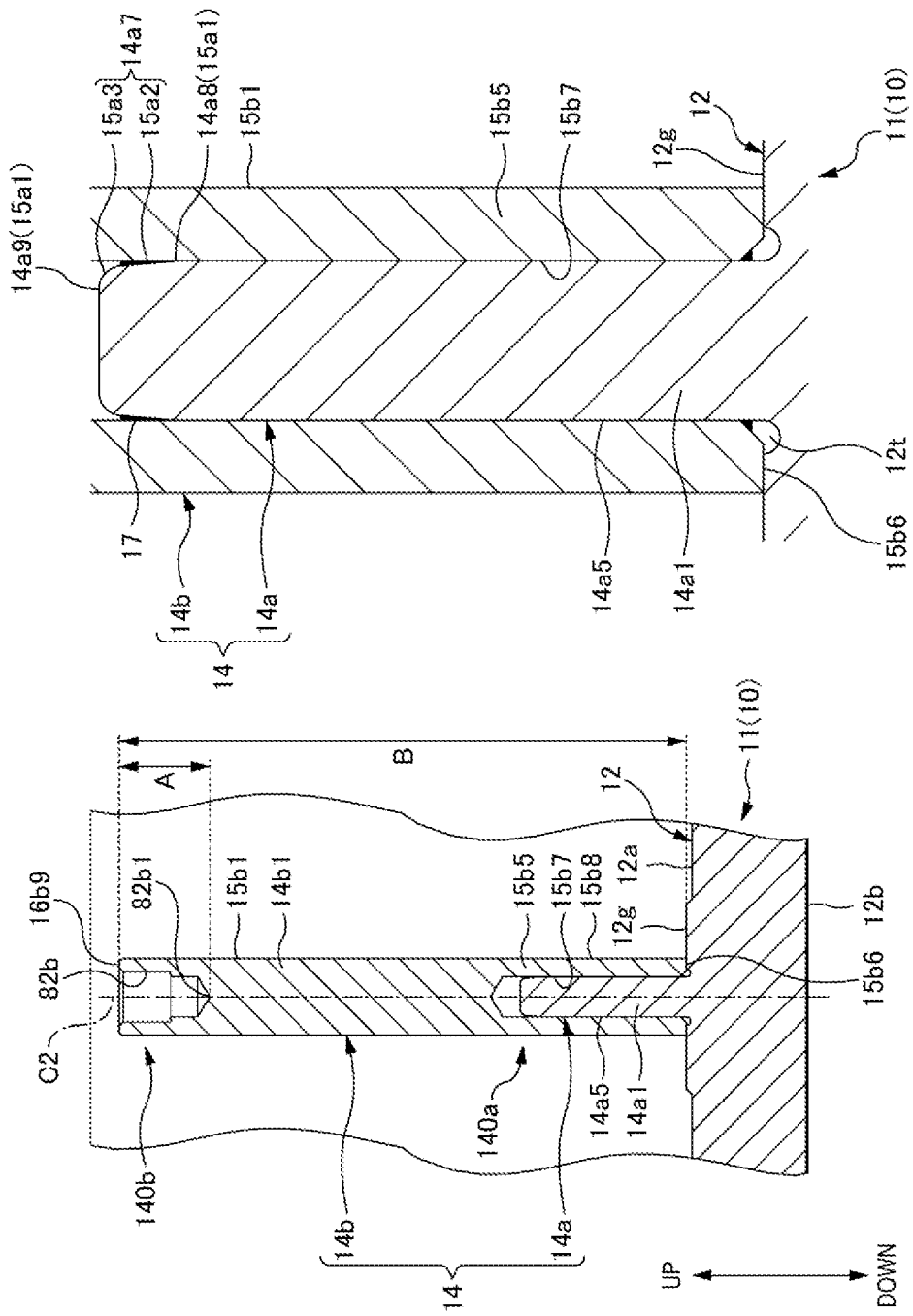
FIGS. 7A and 7B include partial cross-sectional views illustrating an example of a base according to a second embodiment.

As illustrated in FIGS. 7A and 7B, the first shaft part 14a is formed integrally with the bottom plate part 12 and includes a first base portion 14a1 extending upward from the bottom plate part 12 and a tapered portion 14a7 extending upward from the first base portion 14a1. In the base main body part 11, a reservoir groove 12t is formed at a radially inner side of the mounting surface 12g.

The second shaft part 14b includes a second base portion 14b1, the cover 40 being attached thereto, a downward extending portion 15b5 extending downward from the second base portion 14b1, and a hole portion 15b7 recessed upward from a lower end surface 15b6 of the downward extending portion 15b5. The second shaft part 14b is manufactured separately from the first shaft part 14a.

In the present embodiment, the second shaft part 14b is formed such that the second base portion outer surface 15b1 and an outer surface 15b8 of the downward extending portion 15b5 are flush with each other. That is, the second shaft part 14b has the same or substantially the same outer diameter at the second base portion 14b1 and the downward extending portion 15b5. Accordingly, a bearing device 70a is attached to the second base portion outer surface 15b1 and the outer surface 15b8 of the downward extending portion 15b5. The second base portion outer surface 15b1 may include an outer diameter smaller than the outer diameter of the outer surface 15b8 of the downward extending portion 15b5. In this case, the bearing device 70a is attached to the outer surface 15b8 of the downward extending portion 15b5.

The first base portion 14a1 has an outer diameter slightly larger than the inner diameter of the hole portion 15b7. Accordingly, the first base portion 14a1 is press-fitted into the hole portion 15b7, and the second shaft part 14b is fixed to the first shaft part 14a. The first base portion 14a1 is at least partially press-fitted into the hole portion 15b7. In a state of the entire first base portion 14a1 being press-fitted into the hole portion 15b7, the lower end surface 15b6 of the downward extending portion 15b5 is in contact with the mounting surface 12g. In a state of the first base portion 14a1 being partially press-fitted into the hole portion 15b7, the lower end surface 15b6 of the downward extending portion 15b5 terminates at a position separated from the mounting surface 12g. That is, the lower end surface 15b6 is not in contact with the mounting surface 12g.

As illustrated in FIG. 7B, the tapered portion 14a7 is formed in a distal end region 15a1 of the first shaft part 14a. The distal end region 15a1 is an upper region of the first shaft part 14a. The distal end region 15a1 is a region between a proximal end 14a8 and a distal end 14a9 at the first base portion 14a1 side. The tapered portion 14a7 is formed such that a distance between the tapered portion and the hole portion 15b7 increases from the proximal end 14a8 toward the distal end 14a9. In the present embodiment, the position of the proximal end 14a8 of the distal end region 15a1 may be appropriately changed in accordance with the press-fit length of the first base portion outer surface 14a5 (the length of a portion of the outer surface of the first shaft part 14a in contact with the hole portion 15b7).

In the present embodiment, the tapered portion 14a7 includes a linear portion 15a2 in a lower region and a curved portion 15a3 in an upper region. The linear portion 15a2 extends obliquely upward and radially inward from the proximal end 14a8. The curved portion 15a3 connects the linear portion 15a2 and the distal end 14a9 and includes a convexly curved surface. As an example, the linear portion 15a2 may have an inclination angle of 3° to 10° with respect to the central axis line C2 of the pivot shaft 14. The tapered portion 14a7 need not include the curved portion 15a3, and in this case, the tapered portion may include another linear portion (not illustrated) connecting the linear portion 15a2 and the distal end 14a9. The other linear portion may have an inclination angle with respect to the central axis line C2 larger than the inclination angle of the linear portion 15a2, and the inclination angle may be 45° as an example.

In the present embodiment, a thermosetting adhesive 17 (an example of an adhesive) is interposed between the first shaft part 14a and the hole portion 15b7 (FIG. 7B). The thermosetting adhesive 17 is at least partially thinly interposed between the first shaft part 14a and the hole portion 15b7 in the top-bottom direction. A part of the thermosetting adhesive 17 may be accumulated in the reservoir groove 12t or may be interposed between the linear portion 15a2 and the hole portion 15b7.

When the screw hole 82b is a blind hole, an axial length A from a bottom portion 82b1 of the screw hole 82b to the upper end surface 16b9 is equal to or less than one fourth, and more preferably equal to or less than one fifth of an axial length B from the mounting surface 12g to the upper end surface 16b9.

Manufacturing of Base 10

A method for manufacturing the base 10 according to the second embodiment will be described with reference to FIG. 4.

1. Casting (S1)

Molten aluminum is injected into each of a die casting mold having a cavity corresponding to the shape of the base main body part 11 and the first shaft part 14a, and a die casting mold having a cavity corresponding to the shape of the second shaft part 14b. After the molten metal cools and solidifies in the cavity, the die casting mold is opened to remove the product, and the remaining and solidified portion in the runner leading to a gate of the die casting mold is cut. The second shaft part 14b may be manufactured by cutting a desired material such as aluminum or stainless steel (SUS), or may be manufactured by forging. The screw hole 82b of the second shaft part 14b may be formed in S1, or may be formed in S5, which will be described below.

2. E-Coat (S2)

While the product (a semi-finished product of the base main body part 11 and the first shaft part 14a) die-cast in S1 is immersed in, for example, an epoxy-resin coating material, an electric current is caused to flow between the coating material and the product. Accordingly, the coating material is adhered to the surface of the product after die casting. In this way, an electrodeposition coating film is formed on the surface of the product.

3. Machining (S3)

Next, machining is performed on the product having the electrodeposition coating film formed in S2. To be specific, a part of the region of the bottom plate upper surface 12a in the product subjected to electrodeposition coating is cut to remove the electrodeposition coating film in the region, thereby forming the mounting surface 12g. In S3, assuming that the second base portion outer surface 15b1 and the outer surface 15b8 of the downward extending portion 15b5 are finished in S5, which will be described below, the second base portion outer surface 15b1 and the outer surface 15b8 of the downward extending portion 15b5 may be machined in a roughly cut state. After S3, the base main body part 11, the first shaft part 14a, and the second shaft part 14b are completed.

4. Adhesive Application and Press-Fitting Adhesion (S4)

Next, the second shaft part 14b prepared in separate steps (for example, cutting, casting, or forging) is fixed to the base main body part 11 and the first shaft part 14a completed through steps from S1 to S3 to complete the base 10. To be specific, the thermosetting adhesive 17 is applied to the vicinity of the lower portion of the hole portion 15b7 of the second shaft part 14b. Subsequently, by applying a downward force to the upper end surface 16b9 of the second shaft part 14b, the second shaft part 14b moves downward from above, and the first shaft part 14a is pushed into the hole portion 15b7. At this time, the thermosetting adhesive 17 functions as a lubricant between the first base portion 14a1 and the hole portion 15b7. Accordingly, the first shaft part 14a is inserted, i.e., press-fitted, into the hole portion 15b7 in the form of an interference fit. After the first shaft part 14a is press-fitted into the hole portion 15b7, a heating treatment is performed to cure the thermosetting adhesive 17. Accordingly, the second shaft part 14b is firmly fixed to the first shaft part 14a.

As the second shaft part 14b moves downward, the thermosetting adhesive 17 is scraped out upward and is at least partially thinly spread between the first base portion 14a1 and the hole portion 15b7. As a result, the thermosetting adhesive 17 is at least partially interposed in the top-bottom direction between the hole portion 15b7 and the first base portion 14a1 and is cured. That is, the thermosetting adhesive 17 may be partially interposed or entirely interposed between the hole portion 15b7 and the first base portion 14a1.

5. Finishing (S5)

Finally, finishing is performed in order to improve the accuracy in the outer diameters of the second base portion outer surface 15b1 and the outer surface 15b8 of the downward extending portion 15b5, the accuracy in the perpendicularity between the outer surface 15b8 of the downward extending portion 15b5 and the mounting surface 12g, and the accuracy in degree of parallelism between the mounting surface 12g and the upper end surface 16b9 of the second shaft part 14b. To be more specific, after the processing of S4, machining such as cutting is performed on the second base portion outer surface 15b1, the outer surface 15b8 of the downward extending portion 15b5, the upper end surface 16b9 of the second shaft part 14b, and the mounting surface 12g, thereby improving the accuracy in the outer diameters, the accuracy in the perpendicularity, and accuracy in the degree of parallelism. The base 10 is completed through S1 to S5 in this manner.

The hard disk drive device 1 is completed by assembling the motor shaft 51, the bearing members 52, the coils 53, the stator cores 54, the rotor 55, the access part 70, and the like to the base 10 completed through above-described S1 to S5, and fastening the cover 40 to the base 10.

First Modification

Next, a first modification of the second embodiment will be described. The base 10 according to the present modification is different from the base 10 according to the second embodiment in terms of the fixing method for the first shaft part 14a and the second shaft part 14b. Hereinafter, configurations having the same or similar functions as the functions of the base 10 according to the second embodiment are denoted by the same reference signs, and descriptions are omitted and only different components are described.

Figure 8:
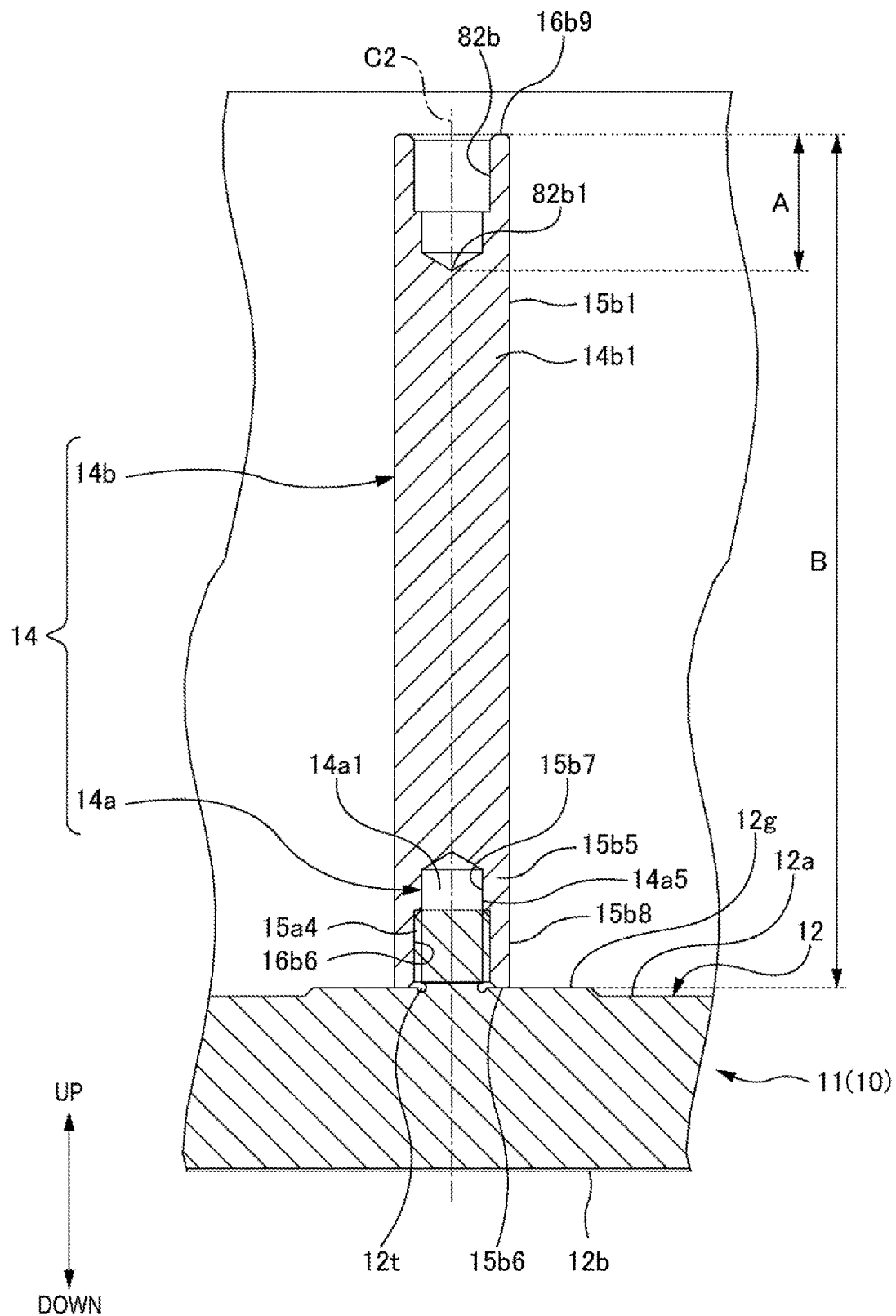
FIG. 8 is a partial cross-sectional view illustrating a first modification of the base illustrated in FIGS. 7A and 7B.

As illustrated in FIG. 8, the first shaft part 14a includes a screw coupling portion 15a4 formed in the first base portion 14a1. The screw coupling portion 15a4 is a male screw formed on the first base portion 14a1.

The second shaft part 14b includes a screw-coupled portion 16b6 recessed upward from the lower end surface 15b6 of the downward extending portion 15b5. The screw-coupled portion 16b6 is a female screw formed in the hole portion 15b7. The screw coupling portion 15a4 is screw-fixed, that is, screwed to the screw-coupled portion 16b6.

When the screw hole 82b is a blind hole, an axial length A from a bottom portion 82b1 of the screw hole 82b to the upper end surface 16b9 is equal to or less than one fourth, and more preferably equal to or less than one fifth of an axial length B from the mounting surface 12g to the upper end surface 16b9.

Manufacturing of Base 10

A method for manufacturing the base 10 according to the first modification will be described with reference to FIG. 6.

As illustrated in FIG. 6, in the step of screw fixing (S4a), the second shaft part 14b prepared in a separate step is screw-fixed to the base main body part 11 and the first shaft part 14a completed through steps from S1 to S3 to complete the base 10. To be specific, the screw coupling portion 15a4 of the first shaft part 14a is screwed to the screw-coupled portion 16b6 of the second shaft part 14b.

In S4a, the thermosetting adhesive 17 may be applied to the vicinity of the lower portion of the hole portion 15b7 of the second shaft part 14b. Subsequently, by rotating the second shaft part 14b with respect to the first shaft part 14a, the screw coupling portion 15a4 is screwed into the screw-coupled portion 16b6. After the screw coupling portion 15a4 is screwed into the screw-coupled portion 16b6, heating treatment is performed to cure the thermosetting adhesive 17. Accordingly, the second shaft part 14b is firmly fixed to the first shaft part 14a. The thermosetting adhesive 17 may be partially interposed or entirely interposed between the first base portion 14a1 and the hole portion 15b7.

Second Modification

Next, a second modification of the second embodiment will be described. The base 10 according to the present modification is different from the base 10 according to the second embodiment in terms of the configuration of the second shaft part 14b. Hereinafter, configurations having the same or similar functions as the functions of the base 10 according to the second embodiment are denoted by the same reference signs, and descriptions are omitted and only different components are described.

Figure 9:
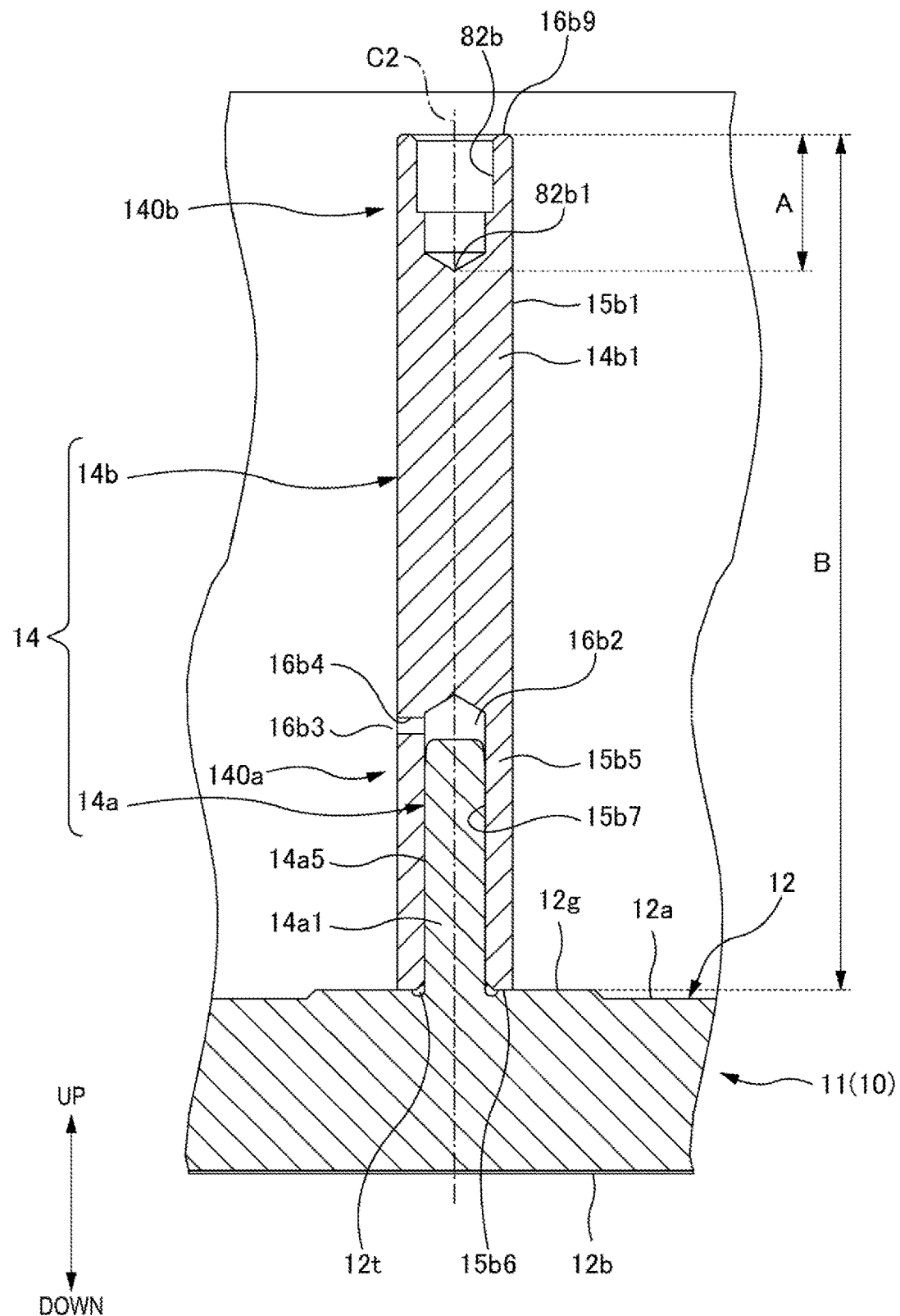
FIG. 9 is a partial cross-sectional view illustrating a second modification of the base illustrated in FIGS. 7A and 7B.

As illustrated in FIG. 9, the second shaft part 14b includes a connection passage 16b4 connecting an interior space 16b2 and an exterior space 16b3 of the hole portion 15b7 with the first base portion 14a1 being press-fitted into the hole portion 15b7. To be specific, the connection passage 16b4 is formed in the vicinity of the upper portion of the downward extending portion 15b5 to pass through the downward extending portion 15b5 in the radial direction. The connection passage 16b4 is formed in the vicinity of an upper portion of the downward extending portion 15b5 not to be closed by the first shaft part 14a with the first base portion 14a1 being press-fitted into the hole portion 15b7. At least one connection passage 16b4 is provided.

When the screw hole 82b is a blind hole, an axial length A from a bottom portion 82b1 of the screw hole 82b to the upper end surface 16b9 is equal to or less than one fourth, and more preferably equal to or less than one fifth of an axial length B from the mounting surface 12g to the upper end surface 16b9.

Third Modification

Next, a third modification of the second embodiment will be described. The base 10 according to the present modification is different from the base 10 according to the second modification in terms of the configuration of the connection passage 16b4. Description is provided below by giving the same reference numerals as the reference numerals of the base 10 according to the second modification.

Figure 10:
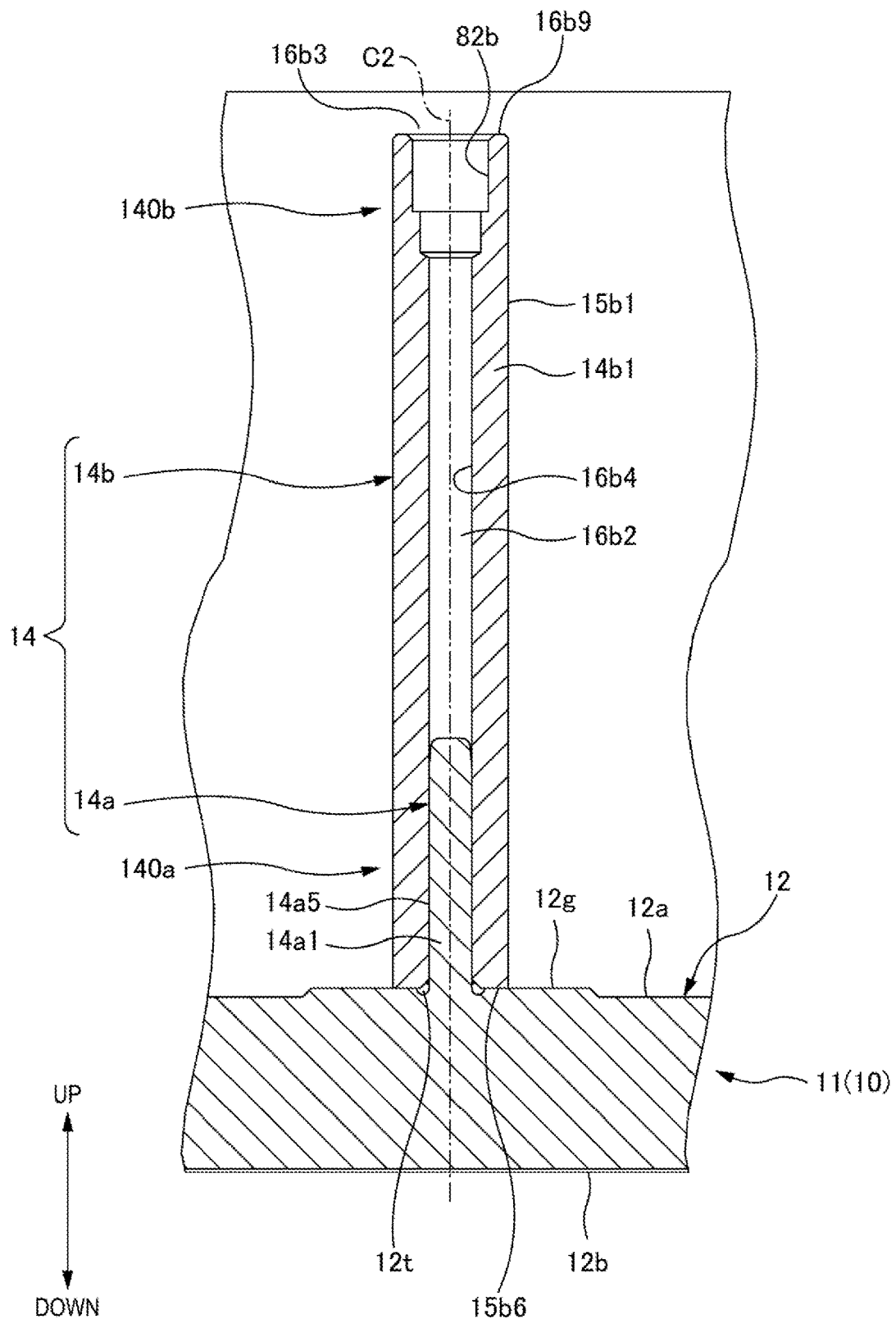
FIG. 10 is a partial cross-sectional view illustrating a third modification of the base illustrated in FIGS. 7A and 7B.

As illustrated in FIG. 10, the second shaft part 14b includes a connection passage 16b4 connecting an interior space 16b2 and an exterior space 16b3 of the hole portion 15b7 with the first base portion 14a1 being press-fitted into the hole portion 15b7. To be specific, the connection passage 16b4 is formed to extend in the top-bottom direction inside the second shaft part 14b, that is, inside the second base portion 14b1. The connection passage 16b4 is formed above the first shaft part 14a with the first base portion 14a1 being press-fitted into the hole portion 15b7. The connection passage 16b4 is spatially connected to, that is, communicates with the screw hole 82b inside the second shaft part 14b. One connection passage 16b4 is provided.

Fourth Modification

Next, a fourth modification of the second embodiment will be described. The base 10 according to the present modification is different from the base 10 according to the second embodiment in terms of the configuration of the second shaft part 14b and the base 10. Hereinafter, configurations having the same or similar functions as the functions of the base 10 according to the second embodiment are denoted by the same reference signs, and descriptions are omitted and only different components are described.

Figure 11:
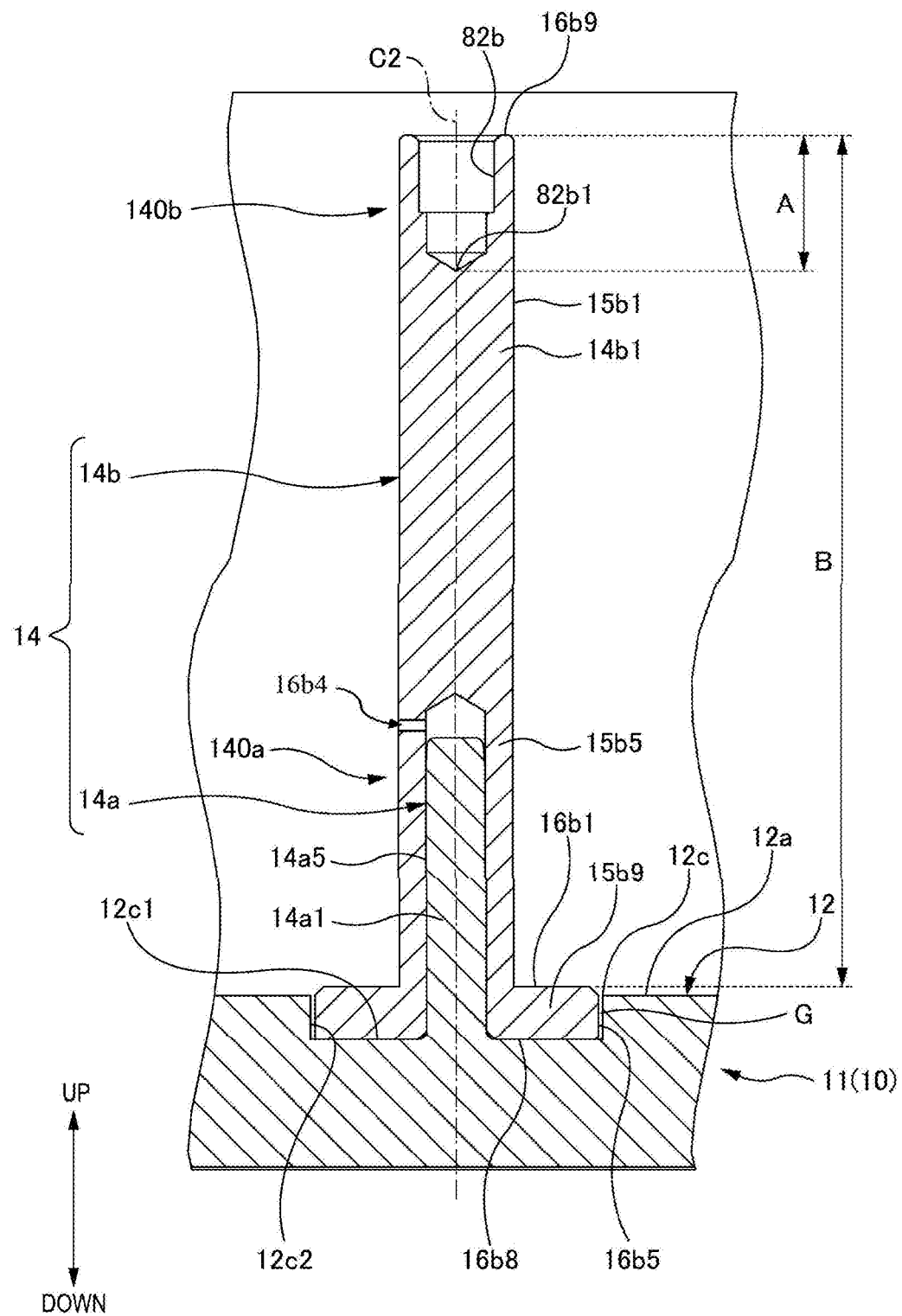
FIG. 11 is a partial cross-sectional view illustrating a fourth modification of the base illustrated in FIGS. 7A and 7B.

As illustrated in FIG. 11, the bottom plate part 12 of the base 10 includes a recessed part 12c formed by a portion of the bottom plate part 12 recessed downward. The recessed part 12c includes a recessed part inner surface 12c2 extending downward from the bottom plate upper surface 12a and a recessed part bottom surface (bottom surface) 12c1 provided at a lower end of the recessed part inner surface 12c2. The recessed bottom surface 12c1 is a surface facing upward, and is located below the bottom plate upper surface 12a and above the bottom plate lower surface 12b.

As illustrated in FIG. 11, the first base portion 14a1 is formed integrally with the recessed part bottom surface 12c1 and extends upward from the recessed part bottom surface 12c1.

The second shaft part 14b includes a flange portion 15b9 extending in a direction perpendicular to the top-bottom direction (i.e., the radial direction) from an outer surface of the downward extending portion 15b5, to be specific, a lower end of the outer surface 15b8 of the downward extending portion 15b5. The flange portion 15b9 is accommodated in the recessed part 12c. The flange portion 15b9 includes a mounting surface 16b1 facing upward and receiving mounting of the access part 70 of the hard disk drive device 1. The mounting surface 16b1 is formed to be slightly higher in the upward direction than the bottom plate upper surface 12a. The bearing device 70a of the access part 70 is placed on the mounting surface 16b1. In addition, the flange portion 15b9 includes a flange outer surface 16b5 extending downward from an outer edge of the mounting surface 16b1. The flange outer surface 16b5 and the recessed part inner surface 12c2 face each other, and a gap G is formed between the flange outer surface 16b5 and the recessed part inner surface 12c2.

When the screw hole 82b is a blind hole, an axial length A from the bottom portion 82b1 of the screw hole 82b to the upper end surface 16b9 is equal to or less than one fourth, and more preferably equal to or less than one fifth of an axial length B from the mounting surface 16b1 to the upper end surface 16b9.

Fifth Modification

Next, a fifth modification of the second embodiment will be described. The base 10 according to the present modification is different from the base 10 according to the fourth modification in terms of the fixing method for the first shaft part 14a and the second shaft part 14b. Hereinafter, configurations having the same or similar functions as the functions of the base 10 according to the fourth modification are denoted by the same reference signs, and descriptions are omitted and only different components are described.

Figure 12:
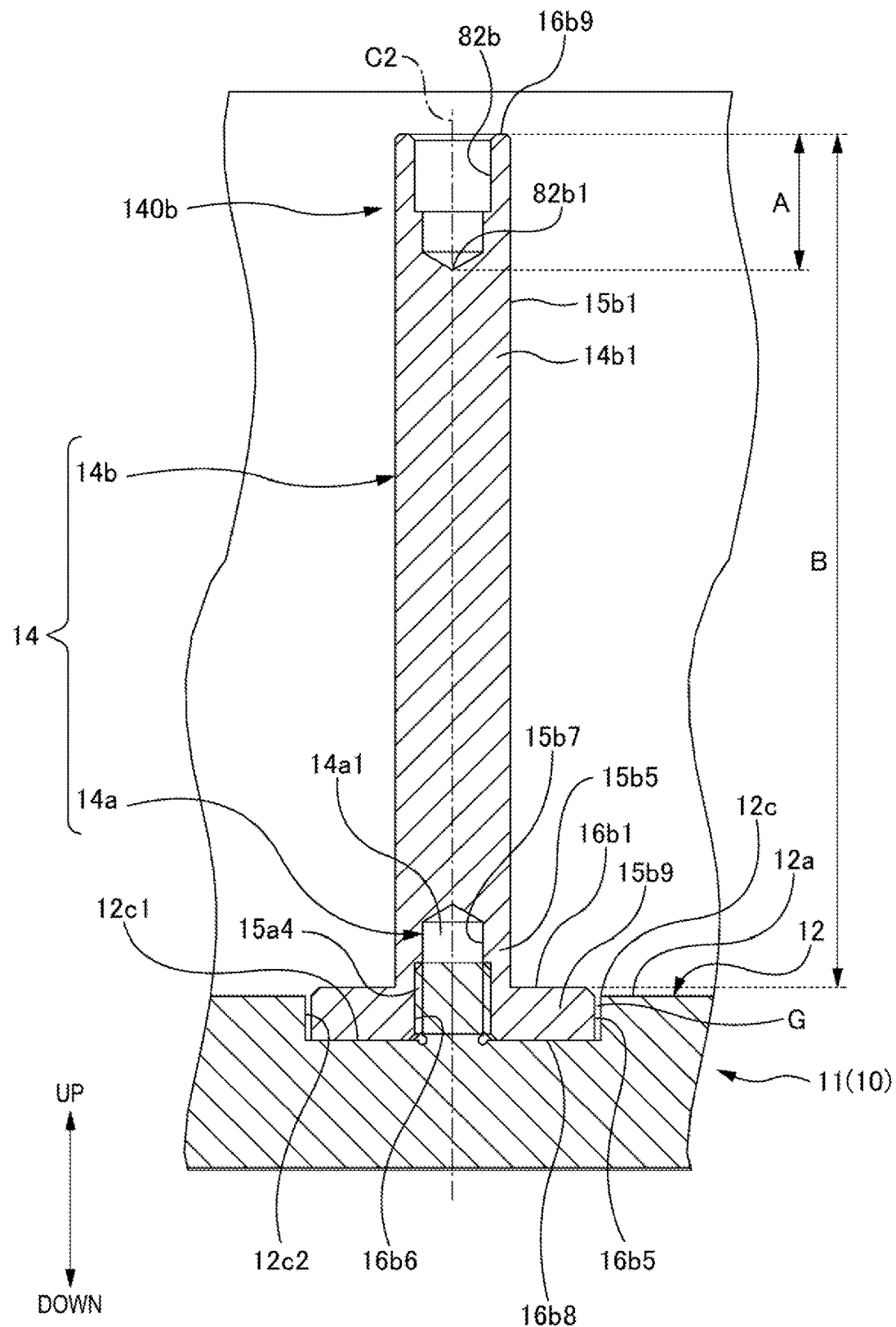
FIG. 12 is a partial cross-sectional view illustrating a fifth modification of the base illustrated in FIGS. 7A and 7B.

As illustrated in FIG. 12, the first shaft part 14a includes a screw coupling portion 15a4 formed in the first base portion 14a1. The screw coupling portion 15a4 is a male screw formed on the first base portion 14a1.

The second shaft part 14b includes a screw-coupled portion 16b6 recessed upward from the lower end surface 16b8 of the downward extending portion 15b5. The screw-coupled portion 16b6 is a female screw formed in the hole portion 15b7. The first shaft part 14a and the second shaft part 14b are fixed by screwing the screw coupling portion 15a4 into the screw-coupled portion 16b6.

When the screw hole 82b is a blind hole, an axial length A from the bottom portion 82b1 of the screw hole 82b to the upper end surface 16b9 is equal to or less than one fourth, and more preferably equal to or less than one fifth of an axial length B from the mounting surface 16b1 to the upper end surface 16b9.

Sixth Modification

Next, a sixth modification of the second embodiment will be described. The base 10 according to the present modification is different from the base 10 according to the fourth modification in terms of the fixing method for the first shaft part 14a and the second shaft part 14b. Hereinafter, configurations having the same or similar functions as the functions of the base 10 according to the fourth modification are denoted by the same reference signs, and descriptions are omitted and only different components are described.

Figure 13:
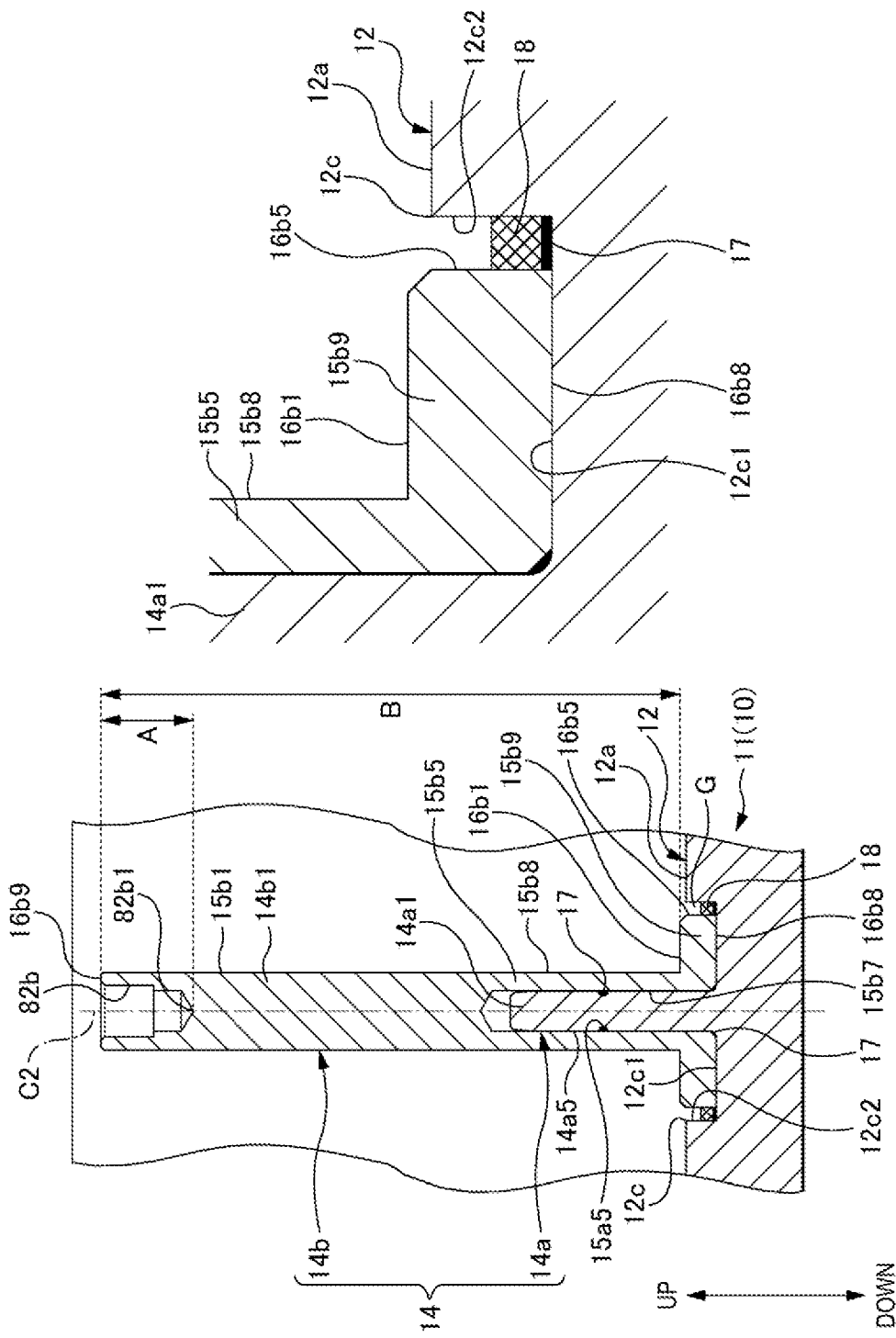
FIGS. 13A and 13B include partial cross-sectional views illustrating a sixth modification of the base illustrated in FIGS. 7A and 7B.

In the present modification, the second shaft part 14b is fixed to the first shaft part 14a only by adhesion. As illustrated in FIGS. 13A and 13B, in the present modification, the first base portion 14a1 includes an annular recessed groove 15a5 recessed radially inward from the first base portion outer surface 14a5. In addition, the thermosetting adhesive 17 is interposed between the first base portion 14a1 and the hole portion 15b7. To be specific, the thermosetting adhesive 17 is interposed between the first base portion 14a1 and the hole portion 15b7, between a flange lower surface 16b8 and the recessed part bottom surface 12c1, and in the gap G, and is retained in the recessed groove 15a5. The flange lower surface 16b8 is a surface that the flange portion 15b9 faces downward, extends radially inward from a lower end of the flange outer surface 16b5, and surrounds the first shaft part 14a in the circumferential direction. In addition, an ultraviolet-curable adhesive 18 is interposed in the gap G.

When the screw hole 82b is a blind hole, an axial length A from the bottom portion 82b1 of the screw hole 82b to the upper end surface 16b9 is equal to or less than one fourth, and more preferably equal to or less than one fifth of an axial length B from the mounting surface 16b1 to the upper end surface 16b9.

Manufacturing of Base 10

Figure 14:
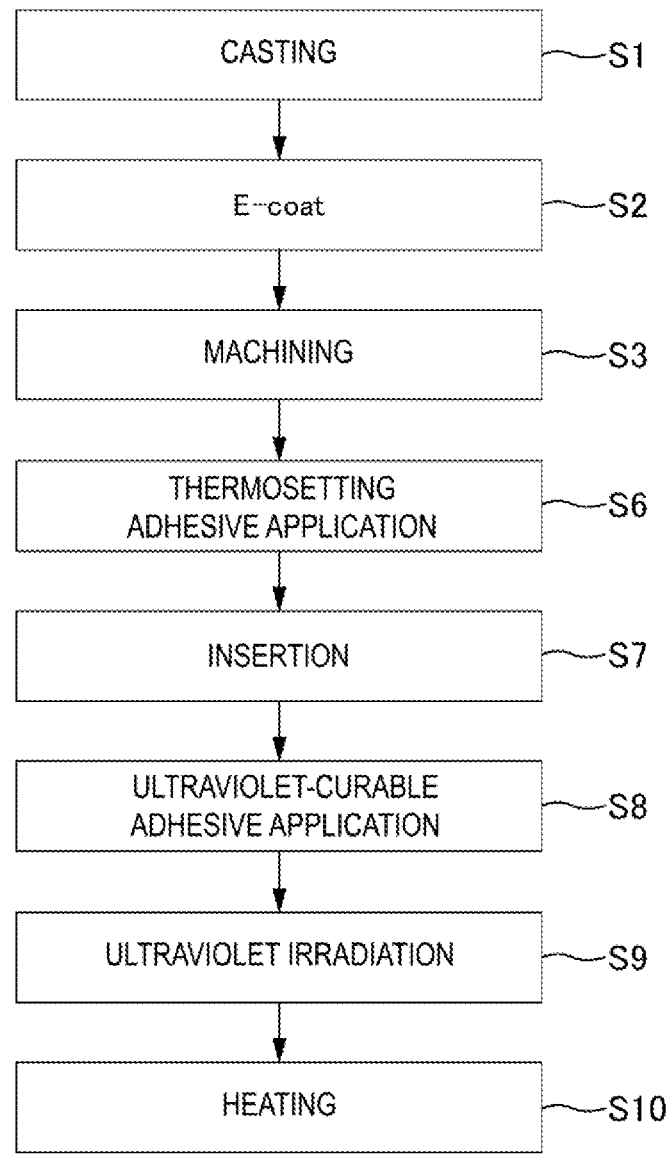
FIG. 14 is a flowchart showing an example of a manufacturing method for the base illustrated in FIGS. 13A and 13B.

Steps from S6 to S10 will be described with reference to FIG. 14. That is, the steps in which the second shaft part 14b prepared in separate steps (for example, cutting, casting, forging, or the like) is fixed to the base main body part 11 and the first shaft part 14a completed through steps from S1 to S3 to complete the base 10 will be described. After the steps from S6 to S10, finishing is performed.

1. Thermosetting Adhesive Application(S6)

The thermosetting adhesive 17 is applied to the vicinity of the upper part of the first shaft part 14a.

2. Insertion (S7)

Subsequently, by applying a downward force to the upper end surface 16b9 of the second shaft part 14b, the second shaft part 14b moves downward from above. Accordingly, the first base portion 14a1 is inserted into the hole portion 15b7. As the second shaft part 14b moves downward, the thermosetting adhesive 17 is scraped out downward and is at least partially thinly spread between the first base portion 14a1 and the hole portion 15b7. As a result, the thermosetting adhesive 17 is interposed between the first base portion 14a1 and the hole portion 15b7, between the flange lower surface 16b8 and the recessed part bottom surface 12c1, and in the gap G, and is retained in the recessed groove 15a5.

3. Ultraviolet-Curable Adhesive Application (S8)

Subsequently, the ultraviolet-curable adhesive 18 is applied to the gap G.

4. Ultraviolet Irradiation (S9)

The ultraviolet-curable adhesive 18 interposed in the gap G is irradiated with ultraviolet rays. As a result, the ultraviolet-curable adhesive 18 is cured, and the second shaft part 14b is fixed to the base main body part 11.

5. Heating (S10)

The base main body part 11, the first shaft part 14a, and the second shaft part 14b are heated by using a device such as an oven (not illustrated). As a result, the thermosetting adhesive 17 is cured, and the second shaft part 14b is firmly fixed to the first shaft part 14a and the base main body part 11.

Seventh Modification

Next, a seventh modification of the second embodiment will be described. The base 10 according to the present modification is different from the base 10 according to the second embodiment (FIGS. 7A and 7B) in terms of the fixing method for the first shaft part 14a and the second shaft part 14b. Hereinafter, configurations having the same or similar functions as the functions of the base 10 according to the second embodiment are denoted by the same reference signs, and descriptions are omitted and only different components are described.

Figure 15:
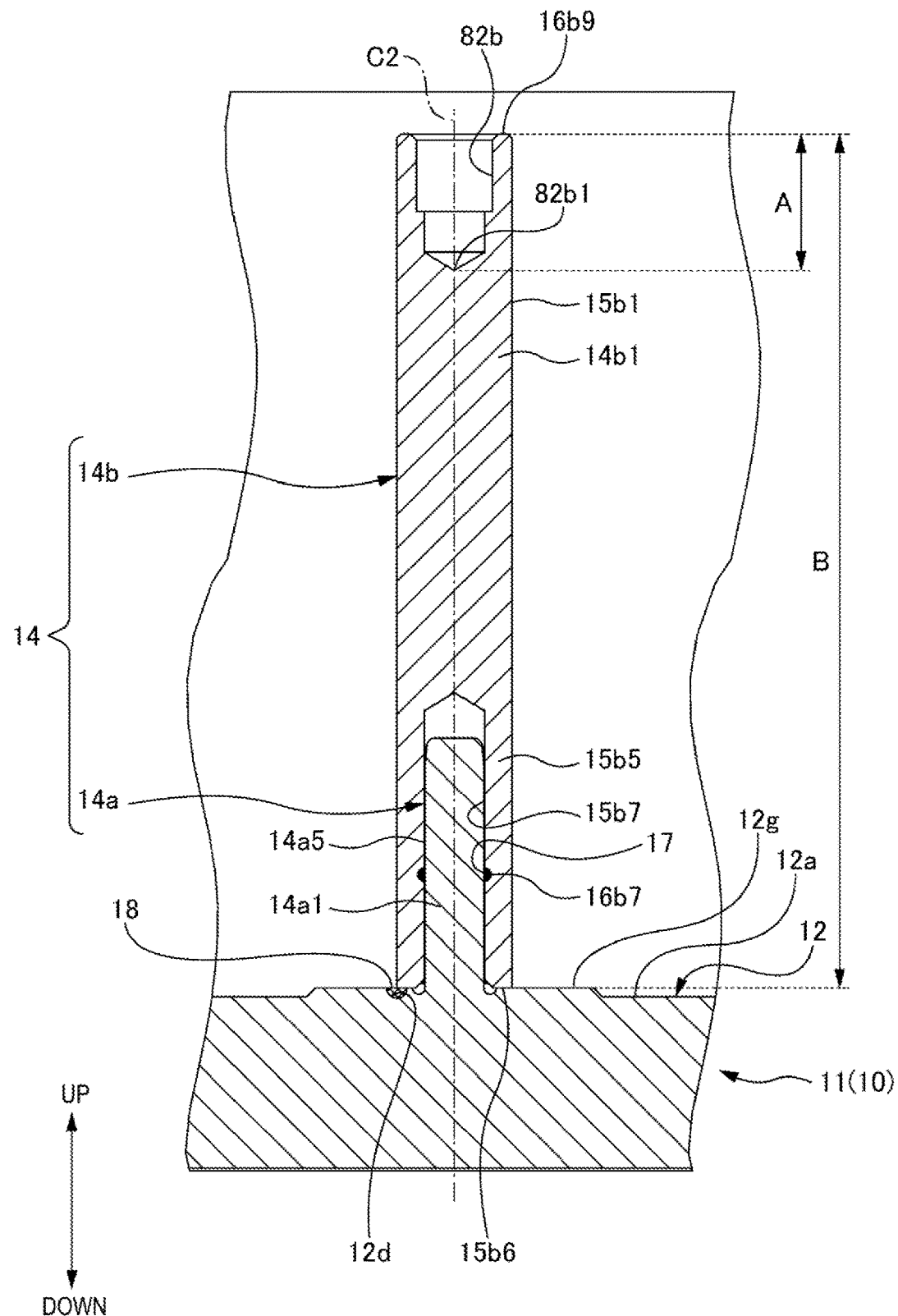
FIG. 15 is a partial cross-sectional view illustrating a seventh modification of the base illustrated in FIGS. 7A and 7B.

In the present modification, the second shaft part 14b is fixed to the first shaft part 14a only by adhesion. As illustrated in FIG. 15, in the present modification, the base 10 includes at least one groove 12d recessed downward in the bottom plate upper surface 12a. The groove 12d may be formed in an annular shape in the circumferential direction around the central axis line C2, may be scattered in the circumferential direction, or only one may be provided. In addition, the thermosetting adhesive 17 is interposed between the first base portion 14a1 and the hole portion 15b7. To be specific, the thermosetting adhesive 17 is interposed between the first base portion 14a1 and the hole portion 15b7 and is retained in a recessed groove 16b7. In addition, the ultraviolet-curable adhesive 18 is retained in the groove 12d. An anaerobic adhesive may be retained in the groove 12d.

As illustrated in FIG. 15, the downward extending portion 15b5 is in contact with the bottom plate upper surface 12a, i.e., the mounting surface 12g, while the lower end surface 15b6 at least partially covers the groove 12d. When the ultraviolet-curable adhesive is retained in the groove 12d, the lower end surface 15*b*6 of the downward extending portion 15*b*5 partially covers the groove 12*d*. When an anaerobic adhesive is retained in the groove 12*d*, the lower end surface 15*b*6 of the downward extending portion 15*b*5 may cover the entire groove 12*d*.

When the screw hole 82*b* is a blind hole, an axial length A from a bottom portion 82*b*1 of the screw hole 82*b* to the upper end surface 16*b*9 is equal to or less than one fourth, and more preferably equal to or less than one fifth of an axial length B from the mounting surface 12*g* to the upper end surface 16*b*9.

Manufacturing of Base 10

Manufacturing steps of the base 10 according to the seventh modification will be described with reference to FIG. 14. After the steps of S1 to S7, the ultraviolet-curable adhesive 18 is applied to the groove 12*d* (S8). Subsequently, the ultraviolet-curable adhesive 18 applied to the groove 12*d* is irradiated with ultraviolet rays (S9). As a result, the ultraviolet-curable adhesive 18 is cured, and the second shaft part 14*b* is fixed to the base main body part 11. The base main body part 11 is heated by using a device such as an oven (not illustrated) (S10). As a result, the thermosetting adhesive 17 is cured, and the second shaft part 14*b* is firmly fixed to the first shaft part 14*a* and the base main body part 11.

In the manufacturing steps of the base 10 according to the seventh modification, the ultraviolet-curable adhesive 18 may be applied to the groove 12*d* (S8) after the steps from S1 to S6. Subsequently, by applying a downward force to the upper end surface 16*b*9 of the second shaft part 14*b*, the second shaft part 14*b* moves downward from above. Accordingly, the first base portion 14*a*1 is inserted into the hole portion 15*b*7 (S7). Subsequently, the ultraviolet-curable adhesive 18 applied to the groove 12*d* is irradiated with ultraviolet rays (S9). Next, the base main body part 11 is heated by using a device such as an oven (not illustrated) (S10).

When an anaerobic adhesive is to be retained in the groove 12*d*, an anaerobic adhesive is applied to the groove 12*d* (not illustrated) after the manufacturing steps from S1 to S6 in the manufacturing steps of the base 10 according to the seventh modification. Subsequently, by applying a downward force to the upper end surface 16*b*9 of the second shaft part 14*b*, the second shaft part 14*b* moves downward from above. Accordingly, the first base portion 14*a*1 is inserted into the hole portion 15*b*7 (S7). Next, the base main body part 11 is heated by using a device such as an oven (not illustrated) (S10).

In the above-described embodiment, the following aspects are disclosed.

First Aspect

The base 10 serves as a part of the housing 30 of the hard disk drive device 1, and includes the bottom plate part 12 and the pivot shaft 14 extending in the top-bottom direction. The pivot shaft 14 includes the first shaft part 14*a* formed integrally with the bottom plate part 12, and the second shaft part 14*b* fixed to the first shaft part 14*a* in the lower end region 140*a*, the cover 40 of the hard disk drive device 1 being attached to the second shaft part 14*b* in the upper end region 140*b*.

According to the base 10 of a first aspect, since the first shaft part 14*a* is formed integrally with the bottom plate part 12, it is possible to enhance the sealability of the base 10.

Furthermore, since the pivot shaft 14 is formed by fixing the second shaft part 14*b* prepared as a member separate from the first shaft part 14*a* to the first shaft part 14*a*, the occurrence of blow holes in the pivot shaft 14 is prevented as compared to the pivot shaft 14 formed only by the first shaft part 14*a*. Since blow holes do not occur in the pivot shaft 14, the rigidity of the pivot shaft 14 does not deteriorate. Therefore, the movement of the access part 70 is stabilized during driving of the spindle motor 50. Furthermore, when the screw 80*b* is screwed into the screw hole 82*b* of the pivot shaft 14, damage to the screw hole 82*b* is prevented, so sufficient fastening strength can be ensured. In addition, since damage to the screw hole 82*b* is prevented, it is also possible to prevent broken pieces from being mixed into the housing 30.

Second Aspect

In the first aspect, the first shaft part 14*a* and the second shaft part 14*b* are fixed through at least one of press-fitting and adhesion, or at least one of screwing and adhesion.

According to the base 10 of a second aspect, by fixing the first shaft part 14*a* and the second shaft part 14*b* through press-fitting, it is possible to realize firm fixation. Furthermore, by fixing the first shaft part 14*a* and the second shaft part 14*b* through press-fitting and adhesion, it is possible to further firmly fix the first shaft part 14*a* and the second shaft part 14*b*.

In addition, since the first shaft part 14*a* and the second shaft part 14*b* are fixed through screwing, assembly can be easily performed. Furthermore, the first shaft part 14*a* and the second shaft part 14*b* can be firmly fixed by using adhesion in combination with screwing.

Third Aspect

In the first or second aspect, the second shaft part 14*b* includes the second base portion 14*b*1, and the pin portion 14*b*2 extending downward from the second base portion 14*b*1 and having a smaller diameter than the second base portion 14*b*1, the cover 40 being attached to the second base portion 14*b*1. The first shaft part 14*a* includes the first base portion 14*a*1 extending upward from the bottom plate part 12, the upward extending portion 14*a*2 extending upward from the first base portion 14*a*1, and the hole portion 14*a*4 recessed downward from the upper portion surface 14*a*3 of the upward extending portion 14*a*2, the pin portion 14*b*2 being press-fitted into the hole portion 14*a*4.

According to the base 10 of a third aspect, since the first base portion 14*a*1 is formed integrally with the bottom plate part 12, it is possible to improve the accuracy in the perpendicularity between the first base portion 14*a*1 and the bottom plate part 12 as compared to the first base portion provided as a separate member from the bottom plate part 12.

Fourth Aspect

In the third aspect, the pin portion 14*b*2 includes the tapered portion 14*b*6, the distance from the hole portion 14*a*4 increasing from the proximal end 14*b*4 of the distal end region 14*b*3 toward the distal end 14*b*5 in the distal end region 14*b*3 of the pin portion 14*b*2.

According to the base 10 of a fourth aspect, when the second shaft part 14*b* is fixed to the first shaft part 14*a*, even when the central axis lines of both the pin portion 14*b*2 and the hole portion 14*a*4 are misaligned, the tapered portion 14*b*6 can allow the pin portion 14*b*2 to be press-fitted into the hole portion 14*a*4 with the two central axis lines aligned or substantially aligned.

Therefore, the pin portion 14*b*2 is easily press-fitted into the hole portion 14*a*4.

Fifth Aspect

In the third or fourth aspect, the thermosetting adhesive 17 is interposed between the pin portion 14*b*2 and the hole portion 14*a*4.

According to the base 10 of a fifth aspect, the pin portion 14b2 and the hole portion 14a4 can be firmly fixed by the thermosetting adhesive 17.

Sixth Aspect

In any one of the third to fifth aspects, the first shaft part 14a or the second shaft part 14b includes a connection passage connecting an interior space and an exterior space of the hole portion 14a4 with the pin portion 14b2 being press-fitted into the hole portion 14a4.

According to the base 10 of a sixth aspect, air in the interior space of the hole portion 14a4 can be discharged to the exterior space at the time of press-fitting. Therefore, the pin portion 14b2 can be press-fitted into the hole portion 14a4 with an appropriate press-fit margin, and the first shaft part 14a and the second shaft part 14b can be fixed with appropriate strength.

Seventh Aspect

In the first or second aspect, the second shaft part 14b includes the second base portion 14b1, and the screw coupling portion 15b4 extending downward from the second base portion 14b1 and having a smaller diameter than the second base portion 14b1, the cover 40 being attached to the second base portion 14b1. The first shaft part 14a includes the first base portion 14a1 extending upward from the bottom plate part 12, the upward extending portion 14a2 extending upward from the first base portion 14a1, and the screw-coupled portion 14a6 recessed downward from the upper portion surface 14a3 of the upward extending portion 14a2, the screw coupling portion 15b4 being screwed into the screw-coupled portion 14a6.

According to the base 10 of a seventh aspect, the first shaft part 14a and the second shaft part 14b can be fixed by screwing the screw coupling portion 15b4 into the screw-coupled portion 14a6. Thus, the first shaft part 14a and the second shaft part 14b can be easily assembled.

Eighth Aspect

In the first or second aspect, the first shaft part 14a includes the first base portion 14a1 extending upward from the bottom plate part 12. The second shaft part 14b includes the second base portion 14b1, the downward extending portion 15b5 extending downward from the second base portion 14b1, and the hole portion 15b7 recessed upward from the lower end surface 15b6 of the downward extending portion 15b5, the cover 40 being attached to the second base portion 14b1, the first base portion 14a1 being at least partially press-fitted into the hole portion 15b7.

According to the base 10 of an eighth aspect, the second shaft part 14b is provided with the hole portion 15b7, the first base portion 14a1 being at least partially press-fitted into the hole portion 15b7. That is, the outer surface of the pivot shaft 14 is constituted by only the second shaft part 14b. Therefore, the accuracy in outer diameter of the pivot shaft 14 can be improved as compared to the outer surface of the pivot shaft 14 formed of a different member.

Ninth Aspect

In the eighth aspect, the bottom plate part 12 includes a recessed part 12c formed by recessing a portion of the bottom plate part 12 downward. The first base portion 14a1 extends upward from the recessed part bottom surface 12c1. The second shaft part 14b is accommodated in the recessed part 12c and includes the flange portion 15b9 extending from an outer surface of the downward extending portion 15b5 in a direction perpendicular to the top-bottom direction. The flange portion 15b9 includes a mounting surface 16b1 facing upward, the access part 70 of the hard disk drive device 1 being mounted on the mounting surface 16b1.

According to the base 10 of a ninth aspect, since the mounting surface 16b1 is formed on the pivot shaft 14 itself, it is possible to improve the accuracy in perpendicularity between the downward extending portion 15b5 and the mounting surface 16b1 in the process of manufacturing the pivot shaft 14. In addition, the accuracy in degree of parallelism between the mounting surface 16b1 and the upper end surface 16b9 of the second shaft part 14b can be improved.

Tenth Aspect

In the eighth or ninth aspect, the first shaft part 14a includes the tapered portion 14a7 extending upward from the first base portion 14a1, a distance between the tapered portion 14a7 and the hole portion 15b7 increasing from the proximal end 14a8 at the first base portion 14a1 side toward the distal end 14a9.

According to the base 10 of a tenth aspect, when the second shaft part 14b is fixed to the first shaft part 14a, even if the central axis lines of both the first base portion 14a1 and the hole portion 15b7 are misaligned, the tapered portion 14a7 can allow the first base portion 14a1 to be press-fitted into the hole portion 15b7 with the two central axis lines aligned or substantially aligned. Therefore, the first base portion 14a1 can be easily press-fitted into the hole portion 15b7.

Eleventh Aspect

In any one of the eighth to tenth aspects, the thermosetting adhesive 17 is interposed between the first base portion 14a1 and the hole portion 15b7.

According to the base 10 of an eleventh aspect, the first base portion 14a1 and the hole portion 15b7 can be firmly fixed through the thermosetting adhesive 17.

Twelfth Aspect

In any one of the eighth to eleventh aspects, the second shaft part 14b includes the connection passage 16b4 connecting the interior space 16b2 and the exterior space 16b3 of the hole portion 15b7 with the first base portion 14a1 being press-fitted into the hole portion 15b7.

According to the base 10 of a twelfth aspect, air in the interior space 16b2 of the hole portion 15b7 can be discharged to the exterior space 16b3 at the time of press-fitting. Therefore, the first base portion 14a1 can be press-fitted into the hole portion 15b7 with an appropriate press-fit margin, and the first shaft part 14a and the second shaft part 14b can be fixed with appropriate strength.

Thirteenth Aspect

In any one of the eighth to twelfth aspects, the flange portion 15b9 includes the flange outer surface 16b5 extending downward from an outer edge of the mounting surface 16b1, forming the gap G between the flange outer surface 16b5 and the recessed part inner surface 12c2.

According to the base 10 of a thirteenth aspect, the flange portion 15b9 can be reliably accommodated in the recessed part 12c. In addition, when the first base portion 14a1 is fixed to the hole portion 15b7 using the thermosetting adhesive 17, even if a large amount of thermosetting adhesive 17 is applied, the thermosetting adhesive 17 can be stored in the gap G. Therefore, attachment of the thermosetting adhesive 17 to the mounting surface 16b1 can be prevented.

Fourteenth Aspect

In any one of the first and second aspects, the first shaft part 14a includes the first base portion 14a1 extending upward from the bottom plate part 12 and the screw coupling portion 15a4 formed in the first base portion 14a1, and the second shaft part 14b includes the second base portion 14b1, the downward extending portion 15b5 extending downward from the second base portion 14*b*1, and the screw-coupled portion 16*b*6 recessed upward from the lower end surface 15*b*6 of the downward extending portion 15*b*5, the cover 40 being attached to the second base portion 14*b*1, the screw coupling portion 15*a*4 being screwed into the screw-coupled portion 16*b*6.

According to the base 10 of a fourteenth aspect, the first shaft part 14*a* and the second shaft part 14*b* can be fixed by screwing the screw coupling portion 15*a*4 into the screw-coupled portion 16*b*6. Thus, the first shaft part 14*a* and the second shaft part 14*b* can be easily assembled.

Fifteenth Aspect

In the fourteenth aspect, the bottom plate part 12 includes the recessed part 12*c* formed by recessing a portion of the bottom plate part 12 downward. The first base portion 14*a*1 extends upward from the recessed part bottom surface 12*c*1. The second shaft part 14*b* is accommodated in the recessed part 12*c* and includes the flange portion 15*b*9 extending from an outer surface of the downward extending portion 15*b*5 in a direction perpendicular to the top-bottom direction. The flange portion 15*b*9 includes a mounting surface 16*b*1 facing upward, the access part 70 of the hard disk drive device 1 being mounted on the mounting surface 16*b*1.

According to the base 10 of a fifteenth aspect, since the mounting surface 16*b*1 is formed on the pivot shaft 14 itself, it is possible to improve the accuracy in perpendicularity between the downward extending portion 15*b*5 and the mounting surface 16*b*1 in the process of manufacturing the pivot shaft 14. In addition, the accuracy in degree of parallelism between the mounting surface 16*b*1 and the upper end surface 16*b*9 of the second shaft part 14*b* can be improved.

Sixteenth Aspect

In the first or second aspect, the bottom plate part 12 includes the recessed part 12*c* formed by recessing a portion of the bottom plate part 12 downward. The first shaft part 14*a* includes a first base portion 14*a*1 extending upward from the recessed part bottom surface 12*c*1. The second shaft part 14*b* includes the second base portion 14*b*1, the downward extending portion 15*b*5 extending downward from the second base portion 14*b*1, the hole portion 15*b*7 recessed upward from the lower end surface 15*b*6 of the downward extending portion 15*b*5, and the flange portion 15*b*9 accommodated in the recessed part 12*c* and extending in a direction perpendicular to the top-bottom direction from an outer surface of the downward extending portion 15*b*5, the cover 40 being attached to the second base portion 14*b*1, the first base portion 14*a*1 being inserted into the hole portion 15*b*7. The flange portion 15*b*9 includes the mounting surface 16*b*1 facing upward, and the flange outer surface 16*b*5 extending downward from an outer edge of the mounting surface 16*b*1 and having a gap G with the recessed part inner surface 12*c*2, the access part 70 of the hard disk drive device 1 being mounted on the mounting surface 16*b*1. The thermosetting adhesive 17 is interposed between the first base portion 14*a*1 and the hole portion 15*b*7, and the ultraviolet-curable adhesive 18 is interposed in the gap G.

According to the base 10 of a sixteenth aspect, when the first base portion 14*a*1 is fixed to the hole portion 15*b*7 using the thermosetting adhesive 17, even if a large amount of thermosetting adhesive 17 is applied, the thermosetting adhesive 17 can be stored in the gap G. Therefore, attachment of the thermosetting adhesive 17 to the mounting surface 16*b*1 can be prevented. In addition, since the thermosetting adhesive 17 can be cured having the second shaft part 14*b* fixed to the base main body part 11 using the ultraviolet-curable adhesive 18, it is possible to prevent a positional deviation of the second shaft part 14*b* from the base main body part 11.

Seventeenth Aspect

In the first or second aspect, the base 10 includes at least one groove side 12*d* recessed downward in the bottom plate upper surface 12*a*. The first shaft part 14*a* includes the first base portion 14*a*1 extending upward from the bottom plate part 12. The second shaft part 14*b* includes the second base portion 14*b*1, the downward extending portion 15*b*5 extending downward from the second base portion 14*b*1 and contacting the upper surface while at least partially covering the groove 12*d* on the lower end surface 15*b*6, and the hole portion 15*b*7 recessed upward from the lower end surface 15*b*6, the cover 40 being attached to the second base portion 14*b*1, the first base portion 14*a*1 being inserted into the hole portion 15*b*7. The thermosetting adhesive 17 is interposed between the first base portion 14*a*1 and the hole portion 15*b*7, and the ultraviolet-curable adhesive 18 or an anaerobic adhesive is retained in the groove 12*d*.

According to the base 10 of a seventeenth aspect, since the thermosetting adhesive 17 can be cured having the second shaft part 14*b* fixed to the base main body part 11 using the ultraviolet-curable adhesive 18 or the anaerobic adhesive, it is possible to prevent a positional deviation of the second shaft part 14*b* from the base main body part 11.

Eighteenth Aspect

In any one of the first to seventeenth aspects, annular recessed grooves 15*a*5 and 16*b*7 are provided in at least one of the first base portion outer surface 14*a*5 and the inner surface of the hole portion 15*b*7.

According to the base 10 of an eighteenth aspect, since the thermosetting adhesive 17 can be retained in the recessed grooves 15*a*5 and 16*b*7, the first base portion 14*a*1 and the hole portion 15*b*7 can be firmly fixed through the wedge effect.

Nineteenth Aspect

The hard disk drive device 1 includes: the base described in any one of the first to eighteenth aspects; the cover 40 attached to the base, forming the housing 30 together with the base; the spindle motor 50 disposed inside the housing 30 and supported by the base; the recording disk 60 disposed inside the housing 30 and rotated by the spindle motor 50; and the access part 70 supported by the pivot shaft 14 inside the housing 30, recording data onto the recording disk 60, and reading data recorded on the recording disk.

In the hard disk drive device 1 according to a nineteenth aspect, since the first shaft part 14*a* is formed integrally with the bottom plate part 12, the sealability of the base 10 can be enhanced. Furthermore, since the pivot shaft 14 is formed by fixing the second shaft part 14*b* prepared as a member separate from the first shaft part 14*a* to the first shaft part 14*a*, the occurrence of blow holes in the pivot shaft 14 is prevented as compared to the pivot shaft 14 formed only by the first shaft part 14*a*. Since blow holes do not occur in the pivot shaft 14, the rigidity of the pivot shaft 14 does not deteriorate. Therefore, the movement of the access part 70 is stabilized during driving of the spindle motor 50. Furthermore, when the screw 80*b* is screwed into the screw hole 82*b* of the pivot shaft 14, damage to the screw hole 82*b* is prevented, so sufficient fastening strength can be ensured. In addition, since damage to the screw hole 82*b* is prevented, it is also possible to prevent broken pieces from being mixed into the housing 30.

Twentieth Aspect

In the nineteenth aspect, the housing 30 contains a gas having a lower density than air.

In the hard disk drive device 1 according to a twentieth aspect, a gas having a lower density than air is contained in the housing 30. For this reason, air resistance due to the rotation of the recording disks 60 is reduced. Accordingly, the recording disks 60 can operate with high accuracy and can be made thinner, the number of disks can be increased, and the demand for higher capacity can be met. On the other hand, since the gas having a lower density than air has a small atomic size, the gas is highly likely to leak to the outer side. In this respect, according to the hard disk drive device 1 of the present embodiment, the sealability of the housing 30 can be enhanced, and leakage of helium can be prevented.

Although preferred embodiments of the disclosure have been described above, the disclosure is not limited to the base 10 and the hard disk drive device 1 according to the embodiments described above, and includes various aspects included in concepts and claims of the disclosure. Further, the respective configurations may be selectively combined as appropriate so as to achieve the object and the effects described above. For example, a shape, a material, an arrangement, a size, and the like of the respective components in the embodiments described above may be changed as appropriate according to a specific aspect of the disclosure.

For example, the above-described embodiment has described that the first shaft part 14a includes the hole portion 14a4 and the second shaft part 14b includes the pin portion 14b2 (FIGS. 3A and 3B). However, the first shaft part may include a pin portion and the second shaft part may include a hole portion. That is, the first shaft part may include a first base portion extending upward from the bottom plate part, and a pin portion extending upward from the first base portion and having a smaller diameter than the first base portion. The second shaft part may include a second base portion receiving mounting of the cover, a downward extending portion extending downward from the second base portion, and a hole portion recessed upward from a lower end surface of the downward extending portion and receiving press-fitting of the pin portion.

In this case, the second shaft part may include a connection passage connecting an interior space and an exterior space of the hole portion with the pin portion being press-fitted into the hole portion.

In addition, the first shaft part may include a first base portion extending upward from the bottom plate part, and a screw coupling portion extending upward from the first base portion and having a smaller diameter than the first base portion. The second shaft part may include a second base portion, a downward extending portion extending downward from the second base portion, and a screw-coupled portion recessed upward from a lower end surface of the downward extending portion, the cover being attached to the second base portion, the screw coupling portion being press-fitted into the screw-coupled portion.

The motor shaft 51 may be die cast integrally with the base main body part 11 as a component of the base 10.

In the above-described embodiment, an example of the spindle motor 50 provided with the motor shaft 51 as a component of the stationary part 50a has been described. That is, an example of the motor shaft 51 fixed to the base main body part 11 by press-fitting or the like, and the pair of bearing members 52 fixed to the outer circumferential surface of the motor shaft 51 has been described. However, the spindle motor may include a motor shaft as a component of the rotating part 50b. That is, the spindle motor may be configured by fixing a bearing sleeve, which is not illustrated, to the base and fixing the rotor to an outer circumferential surface of the motor shaft rotatably supported by the bearing sleeve.

While preferred embodiments of the disclosure have been described above, it is to be understood that variations and modifications will be apparent to those skilled in the art without departing from the scope and spirit of the disclosure. The scope of the disclosure, therefore, is to be determined solely by the following claims.

The invention claimed is:

1. A base serving as a part of a housing of a hard disk drive device, the base comprising:
    a bottom plate part; and
    a pivot shaft extending in a top-bottom direction, wherein the pivot shaft includes:
        a first shaft part formed integrally with the bottom plate part; and
        a second shaft part fixed to the first shaft part in a lower end region,
    the second shaft part including an upper end surface and a screw hole formed through the upper end surface, the second shaft part connecting a cover which is fastened to the screw hole by a fastener, wherein
    the first shaft part includes a first base portion extending upward from the bottom plate part,
    the second shaft part includes a second base portion, a downward extending portion extending downward from the second base portion, and a hole portion recessed upward from a lower end surface of the downward extending portion, the cover being attached to the second base portion,
    the bottom plate part includes a recessed part formed by recessing a portion of the bottom plate part downward,
    the first base portion extends upward from a bottom surface of the recessed part,
    the second shaft part includes a flange portion accommodated in the recessed part and extending from an outer surface of the downward extending portion in a direction perpendicular to the top-bottom direction,
    the flange portion includes a mounting surface facing upward, and
    the mounting surface is for mounting an access part.

2. The base according to claim 1, wherein an adhesive is interposed between the first base portion and the hole portion.

3. The base according to claim 1, wherein the downward extending portion includes a connection passage connecting an interior space and an exterior space of the hole portion with the first base portion being press-fitted into the hole portion.

4. The base according to claim 1, wherein the flange portion includes a flange outer surface extending downward from an outer edge of the mounting surface, forming a gap between the flange outer surface and an inner surface of the recessed part.

5. A hard disk drive device comprising:
    the base according to claim 1;
    the cover attached to the base, forming the housing together with the base;
    a spindle motor disposed inside the housing and supported by the base;
    a recording disk disposed inside the housing and rotated by the spindle motor; and
    an access part supported by the pivot shaft inside the housing, recording data onto the recording disk, and reading data recorded on the recording disk.

6. The hard disk drive device according to claim 5, wherein the housing contains a gas having a lower density than air.

7. A base serving as a part of a housing of a hard disk drive device, the base comprising:
   a bottom plate part; and
   a pivot shaft extending in a top-bottom direction, wherein the pivot shaft includes:
   a first shaft part formed integrally with the bottom plate part; and
   a second shaft part fixed to the first shaft part in a lower end region, the second shaft part including an upper end surface and a screw hole formed through the upper end surface, the second shaft part connecting a cover which is fastened to the screw hole by a fastener, wherein
   the first shaft part includes a first base portion extending upward from the bottom plate part,
   the second shaft part includes a second base portion, a downward extending portion extending downward from the second base portion, and a hole portion recessed upward from a lower end surface of the downward extending portion, the cover being attached to the second base portion,
   the first shaft part includes a tapered portion extending upward from the first base portion, and
   a distance between the tapered portion and the hole portion increases from a proximal end at a side of the first base portion toward a distal end.

8. A hard disk drive device comprising:
   the base according to claim 7;
   the cover attached to the base, forming the housing together with the base;
   a spindle motor disposed inside the housing and supported by the base;
   a recording disk disposed inside the housing and rotated by the spindle motor; and
   an access part supported by the pivot shaft inside the housing, recording data onto the recording disk, and reading data recorded on the recording disk.

9. The hard disk drive device according to claim 8, wherein the housing contains a gas having a lower density than air.

10. The base according to claim 7, wherein the downward extending portion includes a connection passage connecting an interior space and an exterior space of the hole portion with the first base portion being press-fitted into the hole portion.

* * * * *